(12) United States Patent
Kang et al.

(10) Patent No.: US 11,811,071 B2
(45) Date of Patent: Nov. 7, 2023

(54) AIR ELECTRODE INCLUDING MULTI-LAYER STRUCTURE WITH EXTENDED THREE-PHASE BOUNDARY AND METHOD FOR MANUFACTURING THE SAME

(71) Applicant: KOREA UNIVERSITY RESEARCH AND BUSINESS FOUNDATION, Seoul (KR)

(72) Inventors: Yongmook Kang, Seoul (KR); Mihui Park, Seoul (KR); Seonyong Cho, Seoul (KR); Wilson Tamakloe, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 86 days.

(21) Appl. No.: 17/512,951

(22) Filed: Oct. 28, 2021

(65) Prior Publication Data
US 2022/0140352 A1    May 5, 2022

(30) Foreign Application Priority Data
Oct. 30, 2020  (KR) .................. 10-2020-0143147

(51) Int. Cl.
*H01M 4/86* (2006.01)
*H01M 12/08* (2006.01)
*H01M 4/88* (2006.01)

(52) U.S. Cl.
CPC ....... *H01M 4/8663* (2013.01); *H01M 4/8605* (2013.01); *H01M 4/8673* (2013.01);
(Continued)

(58) Field of Classification Search
CPC ............ H01M 4/8605; H01M 4/8663; H01M 4/8673; H01M 4/8828; H01M 4/8885; H01M 12/08
See application file for complete search history.

(56) References Cited

U.S. PATENT DOCUMENTS

| 8,728,671 B1* | 5/2014 | Brost | H01M 4/8885 |
| | | | 429/405 |
| 2014/0234733 A1* | 8/2014 | Roev | H01M 4/8657 |
| | | | 429/405 |
| 2017/0141411 A1* | 5/2017 | Kamai | H01M 8/086 |

FOREIGN PATENT DOCUMENTS

| JP | 2020-9609 A | 1/2020 |
| JP | 2020-149819 A | 9/2020 |

(Continued)

OTHER PUBLICATIONS

Office Action dated Oct. 12, 2022, for corresponding Korean Patent Application No. 10-2020-0143147 along with an English machine translation (12 pages).

(Continued)

*Primary Examiner* — Eugenia Wang
(74) *Attorney, Agent, or Firm* — Hauptman Ham, LLP

(57) ABSTRACT

An air electrode including a multi-layer structure with an extended three-phase boundary for a lithium-air secondary battery composed of a lithium anode, a separator, and the air electrode includes an electrode current collector having a shape of a metal foam, and conductor layers disposed on top of and beneath the electrode current collector to form a multi-layer structure together with the electrode current collector.

8 Claims, 16 Drawing Sheets

(52) U.S. Cl.
CPC ....... *H01M 4/8828* (2013.01); *H01M 4/8885* (2013.01); *H01M 12/08* (2013.01)

(56) References Cited

FOREIGN PATENT DOCUMENTS

| | | |
|---|---|---|
| KR | 10-2010-0107007 A | 10/2010 |
| KR | 10-1105877 B1 | 1/2012 |
| KR | 10-2012-0052335 A | 5/2012 |
| KR | 10-1308677 B1 | 9/2013 |
| KR | 10-2014-0030482 A | 3/2014 |
| KR | 10-1481546 B1 | 1/2015 |
| KR | 10-1765941 B1 | 8/2017 |
| KR | 10-1875031 B1 | 7/2018 |
| KR | 10-2019-0004012 A | 1/2019 |
| KR | 10-2019-0079131 A | 7/2019 |
| KR | 10-2019-0114680 A | 10/2019 |
| KR | 10-2019-0119398 A | 10/2019 |
| KR | 10-2019-0139586 A | 12/2019 |
| KR | 10-2020-0031444 A | 3/2020 |
| KR | 10-2020-0040103 A | 4/2020 |
| KR | 10-2021-0067055 A | 6/2021 |
| WO | WO2006/003950 A1 | 1/2006 |

OTHER PUBLICATIONS

Korean Notice of Allowance dated Jan. 4, 2023 for corresponding Korean Patent Application No. 10-2020-0143147, 2 pages, citing the above reference(s), with English Machine Translation.

* cited by examiner

AIR ELECTRODE INCLUDING MULTI-LAYER STRUCTURE WITH EXTENDED THREE-PHASE BOUNDARY AND METHOD FOR MANUFACTURING THE SAME

CROSS-REFERENCE TO RELATED APPLICATIONS

A claim for priority under 35 U.S.C. § 119 is made to Korean Patent Application No. 10-2020-0143147 filed on Oct. 30, 2020, in the Korean Intellectual Property Office, the entire contents of which are hereby incorporated by reference.

BACKGROUND

Embodiments of the inventive concept described herein relate to an air electrode including a multi-layer structure with an extended three-phase boundary and a method for manufacturing the same.

A lithium-air secondary battery uses lithium for an anode and uses oxygen in the air as a cathode active material and allows lithium ions to react with oxygen to produce electricity. Unlike a conventional secondary battery, the lithium-air secondary battery is possible to store a large amount of anode material therein, so that the lithium-air secondary battery has a large capacity and a high energy density in theory.

According to theoretical studies, the lithium-air secondary battery is currently known to be capable of having the high energy density of 3,456 Wh/kg. The lithium-air secondary battery has the energy density of up to 385 Wh/kg, and it is expected to overcome a travel distance limit of a general electric vehicle using a lithium-ion secondary battery that may provide a travel distance of 300 miles for each hour.

However, electrochemical energy storage output of a recently published prototype lithium-air secondary battery is reported to be only one-third of a maximum theoretical value, so that there are still many technical problems to be overcome in reality until commercialization.

The energy density of such lithium-air secondary battery depends on a capacity yield as a result of an oxygen reduction reaction (ORR) and an overvoltage for decomposing a discharged product as a result of an oxygen evolution reaction (OER). The oxygen reduction reaction and the oxygen evolution reaction depend on a three-phase boundary and formation and decomposition of the discharged product at the three-phase boundary.

Therefore, as described above, the fact that the lithium-air secondary battery does not have the theoretical energy density is resulted from a structure of a cathode and a limited three-phase boundary reaction of the cathode. More specifically, there is a limit to the formation and growth of the discharged product resulted from a chemically discontinuous supply of reactants and a physically limited three-phase boundary.

To solve such problem, solutions such as introducing a catalyst to the cathode, modifying an electrolyte that may adjust a reaction path affecting the formation and the decomposition of the discharged product, and the like have been reported.

However, the above solutions are not able to disclose a method capable of dramatically improving the energy density by changing the structure of the cathode.

SUMMARY

Embodiments of the inventive concept provide an air electrode including a multi-layer structure with an extended three-phase boundary and a method for manufacturing the same that expand a reaction region in which an oxygen reduction reaction and an oxygen evolution reaction occur, and at the same time, accelerate a reaction rate of a reactant.

In addition, embodiments of the inventive concept provide an air electrode including a multi-layer structure with an extended three-phase boundary and a method for manufacturing the same that achieve a high theoretical discharging capacity of a lithium-air secondary battery, and improve charging-discharging life characteristics.

According to an exemplary embodiment, an air electrode including a multi-layer structure with an extended three-phase boundary for a lithium-air secondary battery composed of a lithium anode, a separator, and the air electrode includes an electrode current collector having a shape of a metal foam, and conductor layers disposed on top of and beneath the electrode current collector to form a multi-layer structure together with the electrode current collector.

In addition, the conductor layers may include a first conductor layer containing an electronically conductive material, and a second conductor layer containing a lithium ion conductive material, and the first conductor layer and the second conductor layer may be respectively disposed at different locations among locations on top of and beneath the electrode current collector.

In addition, the multi-layer structure may include a first multi-layer structure with the first conductor layer/the electrode current collector/the second conductor layer sequentially stacked, and a second multi-layer structure with the second conductor layer/the electrode current collector/the first conductor layer sequentially stacked.

In addition, the first conductor layer may contain the electronically conductive material, a conductive carbon matrix, and a binder in a mass ratio of 4:(3.5-5.5):(0.5-2.5), and the electronically conductive material may include one electronically conductive material selected from a group consisting of LiI, LiBr, and $InI_3$, and a group consisting of tetrathiafulvalene (TTF) and 2,2,6,6-tetramethyl-1-piperidinyloxy (TEMPO).

In addition, the second conductor layer may contain the lithium ion conductive material, the conductive carbon matrix, and the binder in the mass ratio of 4:(3.5-5.5):(0.5-2.5), and the lithium ion conductive material may include one lithium ion conductive material selected from a group consisting of $Li_3N$, $Li_3PS_4$, $Li_{0.5}La_{0.5}TiO_3$, and $Li_3OCl$.

In addition, the electrode current collector may contain one metal material selected from a group consisting of nickel, aluminum, iron, and copper.

In addition, the first multi-layer structure may provide diffusion paths such that electrons are diffused in both directions from the first conductor layer to the lithium anode and to the second conductor layer, and the first multi-layer structure may provide diffusion paths such that lithium ions are bi-directionally diffused from the lithium anode and the second conductor layer to the electrode current collector.

In addition, the second multi-layer structure may provide a diffusion path such that the electrons are diffused from the first conductor layer to the lithium anode, and the second multi-layer structure may provide diffusion paths such that the lithium ions are diffused from the lithium anode and the second conductor layer to the first conductor layer.

In addition, a toroidal shaped reaction product may be formed by a solution mechanism on a surface of the first conductor layer.

In addition, a reaction product in a form of a film may be formed by a surface mechanism on a surface of the second conductor layer.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1A:
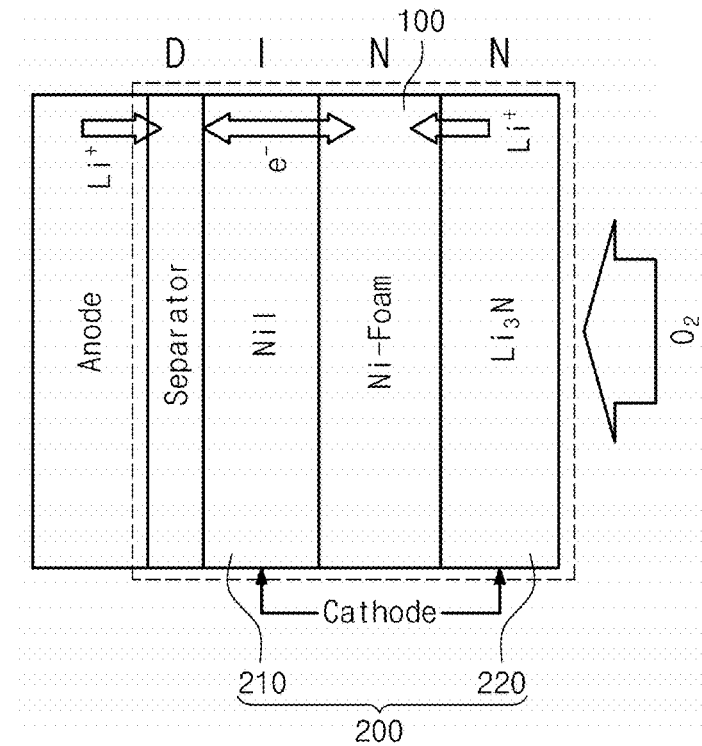
FIGS. 1A and 1B are diagrams for schematically illustrating an air electrode including a multi-layer structure with an extended three-phase boundary according to an embodiment of the inventive concept.

Other advantages and features of the inventive concept and methods of achieving the other advantages and features will become apparent with reference to embodiments as described below in detail with reference to the accompanying drawings. However, the inventive concept is not limited to the embodiments disclosed below, but may be embodied in various different forms. The present embodiment is provided to complete the disclosure of the inventive concept and to fully inform the scope of the invention to a person of ordinary skill in the art to which the inventive concept belongs. The inventive concept is only defined by the scope of the claims.

Even not defined, all terms (including technical or scientific terms) used herein have the same meaning as commonly accepted by universal technology in the prior art to which this invention belongs. Terms defined by general dictionaries may be construed as having the same meaning as the related technology and/or the text of the present application, and won't be conceptualized or excessively formalized even when not clearly defined herein.

The terminology used herein is for the purpose of describing embodiments only and is not intended to be limiting of the inventive concept. In the present specification, the singular forms "a" and "an" are intended to include the plural forms as well, unless the context clearly indicates otherwise. Terms "comprises" and "includes", and/or various conjugations of the terms used herein, for example, "comprising", "including", and the like do not preclude the presence or addition of one or more other compositions, constituents, components, steps, actions and/or elements. In the present specification, the term 'and/or' refers to each of the listed components or various combinations thereof.

Terms 'unit', 'device', 'block', 'module', and the like used throughout the present specification may refer to a unit that processes at least one function or operation. For example, the 'unit', the 'device', the 'block', the 'module', and the like may refer to hardware components such as a FPGA, or an ASIC. However, the 'unit', the 'device', the 'block', the 'module', and the like are not limited to software or hardware. The 'unit', the 'device', the 'block', and the 'module' may be configured to be in an addressable storage medium, or may be configured to execute one or more processors.

Therefore, as an example, 'the 'unit', the 'device', the 'block', and the 'module' include components such as software components, object-oriented software components, class components, and task components, processes, functions, properties, procedures, subroutines, segments of program code, drivers, firmware, microcode, circuitry, data, database, data structures, tables, arrays, and variables. The components and functions provided within the 'units', the 'devices', the 'blocks', and the 'modules' may be coupled to be a smaller number of components and 'units', 'devices', 'blocks', and 'modules', or may be further divided into additional components and 'units', 'devices', 'blocks', and 'modules'.

Hereinafter, specific embodiments of the inventive concept will be described in detail with reference to the drawings attached hereto.

In addition, in describing the inventive concept, when it is determined that a detailed description of a related known component or function may obscure the gist of the inventive concept, the detailed description thereof will be omitted.

The inventive concept is to provide an air electrode including a multi-layer structure with an extended three-phase boundary that may overcome a decrease in discharging capacity resulted from a limited reaction interface, which is a limitation of a conventional lithium-air secondary battery, and approach a theoretical discharging capacity of the lithium-air secondary battery.

Figure 1B:
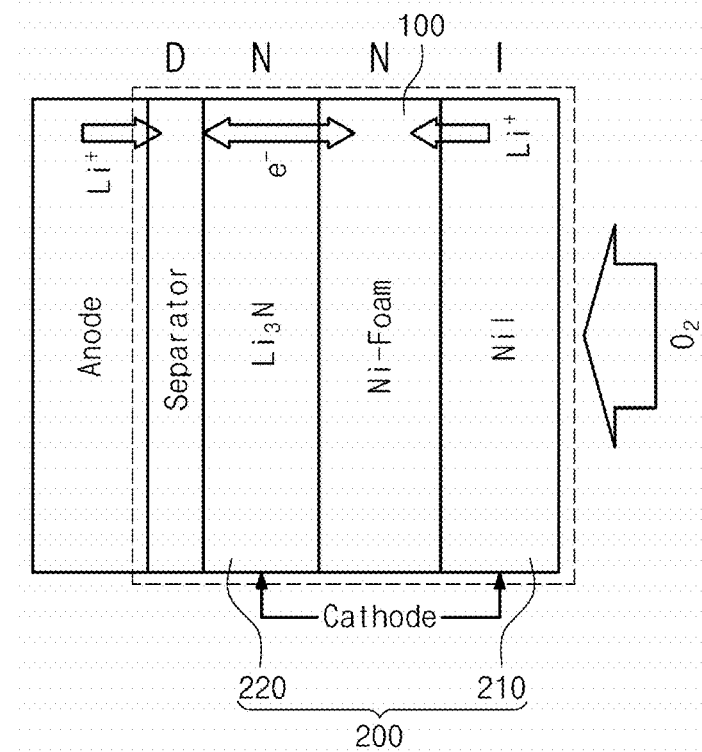
Figure 2A:
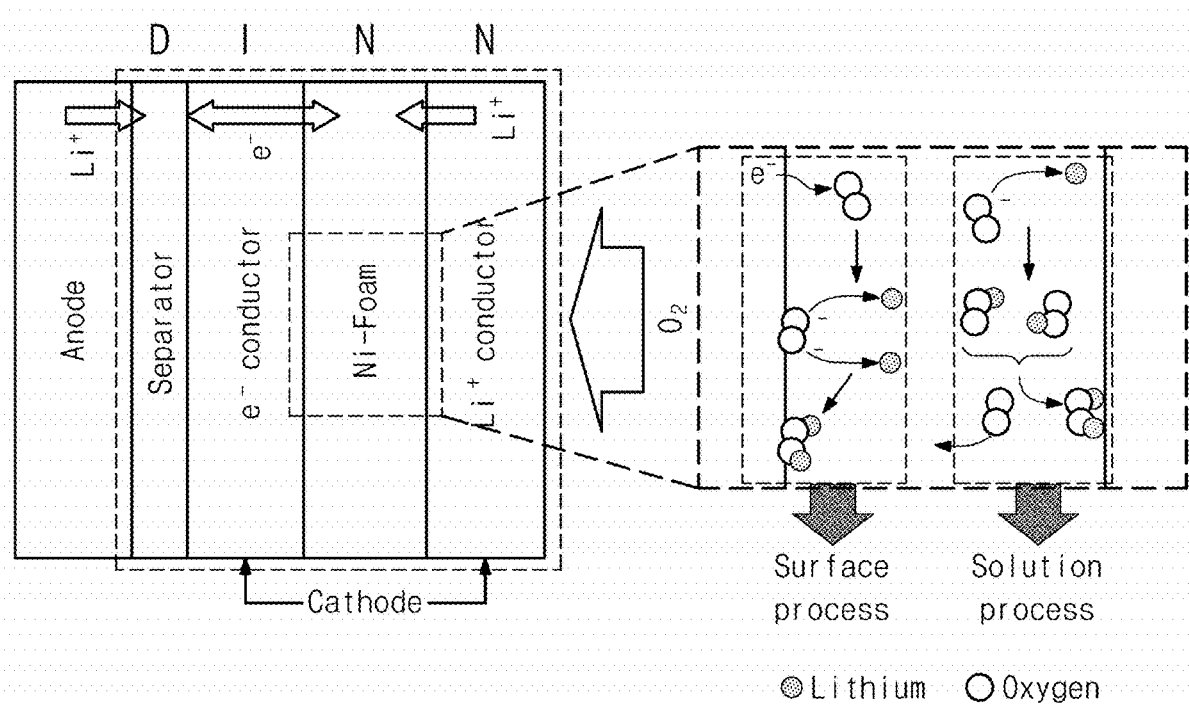
FIG. 2A is a diagram for illustrating a surface mechanism and a solution mechanism of an air electrode including a multi-layer structure with an extended three-phase boundary according to an embodiment of the inventive concept.
Figure 2B:
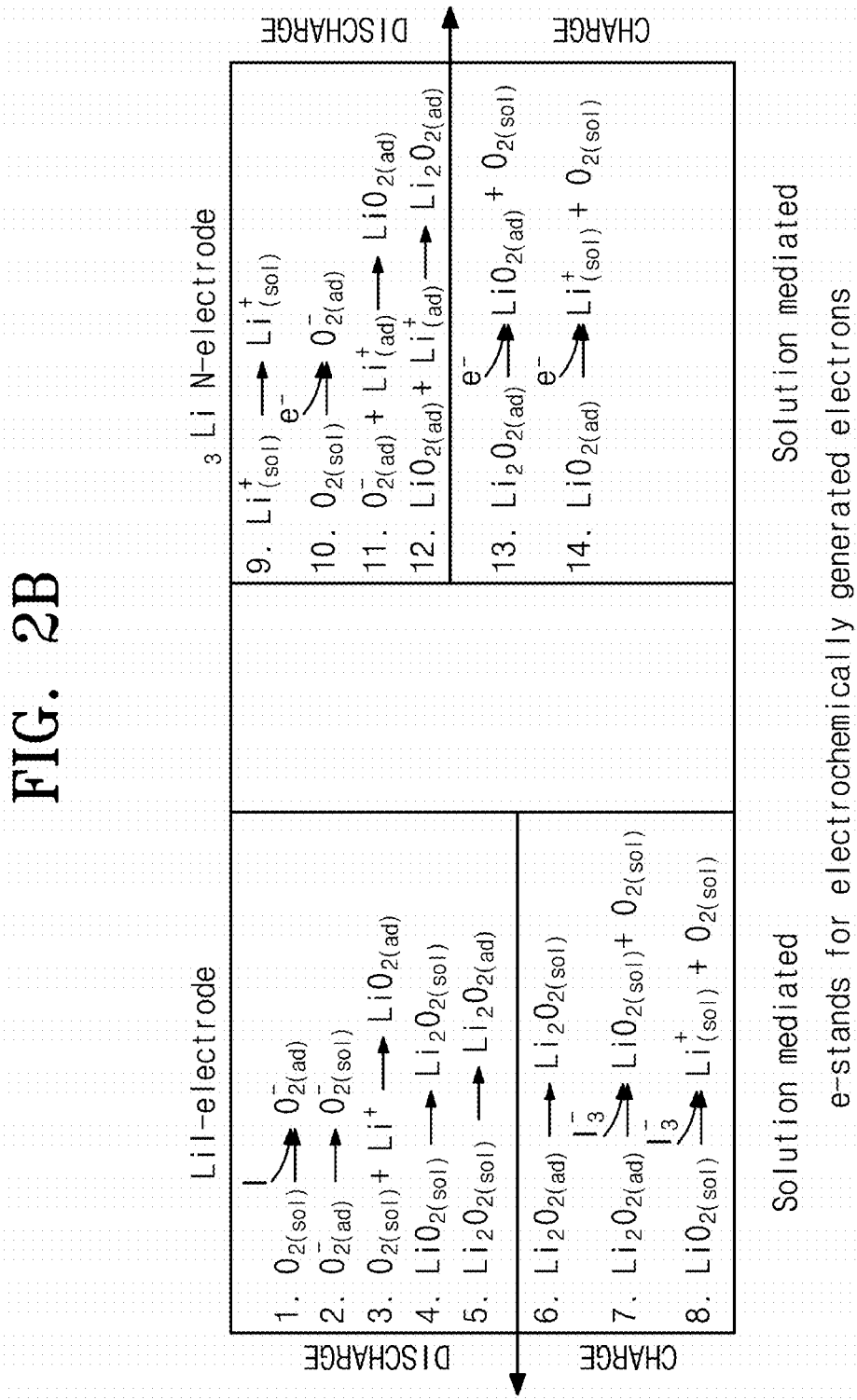
FIG. 2B is a diagram for illustrating the mechanisms of FIG. 2A in more detail.

FIGS. 1A and 1B are diagrams for schematically illustrating an air electrode including a multi-layer structure with an extended three-phase boundary according to an embodiment of the inventive concept, FIG. 2A is a diagram for illustrating a surface mechanism and a solution mechanism of an air electrode including a multi-layer structure with an extended three-phase boundary according to an embodiment of the inventive concept, and FIG. 2B is a diagram for illustrating the mechanisms of FIG. 2A in more detail.

Referring to FIGS. 1A and 1B, an air electrode including a multi-layer structure with an extended three-phase boundary according to an embodiment in the inventive concept includes an electrode current collector 100 having a shape of a metal foam, and conductor layers 200 disposed on top of and beneath the electrode current collector 100 to form a multi-layer structure together with the electrode current collector 100 in a lithium-air secondary battery composed of a lithium anode, a separator, and an air electrode.

The electrode current collector 100, which is a metal of an open cell structure having a pore defined therein, is able to use any material known in the art without limitation.

In addition, the electrode current collector 100 may contain one metal material selected from a group consisting of nickel, aluminum, iron, and copper, but the inventive concept may not be limited thereto. The electrode current collector 100 of the air electrode including the multi-layer structure with the extended three-phase boundary according to an embodiment in the inventive concept preferably contains nickel.

In addition, the electrode current collector 100 has a plurality of pores defined therein, and a size and a thickness of the pore are able to be appropriately adjusted based on a purpose.

In addition, the electrode current collector 100 serves as a path for passing or receiving a reactant including lithium ions, electrons, and oxygen from the outside and flowing the reactant to the outside such that an electrochemical reaction occurs, and the shape of the electrode current collector 100 is not particularly limited as long as it has conductivity without causing a chemical change.

For example, the electrode current collector 100 may form fine irregularities on a surface thereof to increase adhesion with the conductor layers 200. Various forms such as a film, a sheet, a foil, a net, a porous body, a foam, a non-woven, and the like may be used for the electrode current collector 100. A carbon coating layer may be further included on the surface of such current collector.

The conductor layers 200 include a first conductor layer 210 containing an electronically conductive material and a second conductor layer 220 containing a lithium ion conductive material.

In this connection, the first conductor layer 210 and the second conductor layer 220 may be respectively disposed at different locations among locations on top of and beneath the electrode current collector 100.

The conductor layers 200 is not particularly limited as long as it may contain the lithium ion conductive material and the electronically conductive material for the electrochemical reaction and may activate the electrochemical reaction. For expansion of a three-phase boundary, which is a reaction region of reactants, the electrode current collector 100 may be sandwiched between the conductor layers 200 to form the multi-layer structure.

Specifically, the first conductor layer 210 contains the electronically conductive material, a conductive carbon matrix, and a binder in a mass ratio of 4:(3.5-5.5):(0.5-2.5).

The electronically conductive material may include one electronically conductive material selected from a group consisting of LiI, LiBr, and InI$_3$, and a group consisting of tetrathiafulvalene (TTF) and 2,2,6,6-tetramethyl-1-piperidinyloxy (TEMPO). It is preferable that the electronically conductive material of the air electrode including the multi-layer structure with the extended three-phase boundary according to an embodiment of the inventive concept is LiI.

The conductive carbon matrix may not be particularly limited as long as it has the conductivity without causing the chemical change, and may be, for example, one material selected from a group consisting of natural graphite, artificial graphite, carbon black, acetylene black, Ketjen black, channel black, furnace black, lamp black, summer black, and carbon fiber.

The binder is a component that helps bonding of the electronically conductive material and the conductive carbon matrix and bonding to the electrode current collector 100. For example, PVDF-HFP (Poly(vinylidene fluoride-hexafluoropropylene)) is preferably used as the binder.

In addition, the second conductor layer 220 may contain the lithium ion conductive material, the conductive carbon matrix, and the binder in a mass ratio of 4:(3.5-5.5):(0.5-2.5).

The lithium ion conductive material may include one lithium ion conductive material selected from a group consisting of Li$_3$N, Li$_3$PS$_4$, Li$_{0.5}$La$_{0.5}$TiO$_3$, and Li$_3$OCl. The lithium ion conductive material of the air electrode including the multi-layer structure with the extended three-phase boundary according to an embodiment of the inventive concept is preferably Li$_3$N.

In addition, although not shown in the drawings, the air electrode including the multi-layer structure with the extended three-phase boundary according to an embodiment of the inventive concept may use a lithium salt non-aqueous electrolyte including a non-aqueous electrolyte and a lithium salt.

The non-aqueous electrolyte is able to be prepared by dissolving the lithium salt in dimethyl sulfoxide (DMSO), and the lithium salt is preferably lithium triflate (LiCF$_3$SO$_3$).

In addition, the multi-layer structure includes a first multi-layer structure in which the first conductor layer/the electrode current collector/the second conductor layer are sequentially stacked on the separator, and a second multi-layer structure in which the second conductor layer/the electrode current collector/the first conductor layer are sequentially stacked on the separator.

In this connection, the first conductor layer 210 of the first multi-layer structure may be stacked beneath the electrode current collector 100, and the second conductor layer 220 may be stacked on top of the electrode current collector 100.

In addition, the first conductor layer 210 of the second multi-layer structure may be stacked on top of the electrode current collector 100, and the second conductor layer 220 may be stacked beneath the electrode current collector 100.

Preferably, a region beneath the electrode current collector 100 means a region adjacent to the separator.

As shown in FIGS. 1A and 1B, the first multi-layer structure may provide diffusion paths such that the electrons are diffused in both directions from the first conductor layer 210 to the lithium anode and to the second conductor layer 220. In addition, the first multi-layer structure may provide diffusion paths such that the lithium ions are bi-directionally diffused from the lithium anode and the second conductor layer 220 to the electrode current collector 100.

In addition, the second multi-layer structure provides a diffusion path such that the electrons are diffused from the first conductor layer 210 to the lithium anode. In addition, the second multi-layer structure provides diffusion paths such that the lithium ions are diffused from the lithium anode and the second conductor layer 220 to the first conductor layer 210.

FIG. 1A is an air electrode including the first multi-layer structure, and FIG. 1B is an air electrode including the second multi-layer structure.

The air electrode including the multi-layer structure with the extended three-phase boundary according to an embodiment of the inventive concept may form a DINN structure of a structure of the separator—the first conductor layer—the electrode current collector—the second conductor layer with the separator, and may form a DNNI structure of a structure of the separator—the second conductor layer—the electrode current collector—the first conductor layer together with the separator.

Referring to FIG. 2A, a toroidal reaction product may be formed by the solution mechanism on a surface of the first conductor layer 210 of the first multi-layer structure described above.

In addition, a reaction product in a form of a film is formed by the surface mechanism on a surface of the second conductor layer 220 of the first multi-layer structure.

Specifically, the reaction product is generated when the lithium ions generated from the lithium anode meet oxygen of a cathode including the air electrode of the inventive concept during a discharging process of the lithium-air secondary battery. Representative reaction products may be $Li_2O_2$, $Li_2O$, and $LiO_2$.

In addition, the toroidal reaction product formed on the surface of the first conductor layer 210 includes $LiO_2$ and $Li_2O$, and the reaction product in the form of the film formed on the surface of the second conductor layer 220 includes $Li_2O_2$, $Li_2O$, and $LiO_2$.

That is, the first conductor layer 210 may promote the formation of the reaction product by the solution mechanism and the second conductor layer 220 may promote the formation of the reaction product by the surface mechanism, so that the reaction products of different shapes may be formed on the surfaces of the first conductor layer 210 and the second conductor layer 220.

In addition, the air electrode (the DINN structure) including the first multi-layer structure may accelerate reaction rates of the lithium ions and the electrons, may diffuse the lithium ions and the electrons in the both directions, and may increase the reaction region where an oxygen reduction reaction and an oxygen evolution reaction of the reactants including the lithium ions, the electrons, and oxygen occur. That is, a region of the three-phase boundary that is a liquid/solid/gas interface may be increased.

Similarly, the toroidal reaction product may be formed by the solution mechanism on the surface of the first conductor layer 210 of the second multi-layer structure, and the reaction product in the form of the film may be formed by the surface mechanism on the surface of the second conductor layer 220 of the second multi-layer structure.

Referring to FIG. 2B, LiI; $O_2$ is reduced to become $O_2^-$ by a reaction between the first conductor layer and $O_2$, and the reduced $O_2^-$ coordinates with solvated $Li^+$ cations to form $LiO_2$, and forms toroidal $Li_2O_2$ through a disproportionation process.

(The discharge process would involve the migration of solvated Li-ions towards the electrodes on the inside while electrons tunnel through the external circuit towards the outside electrode. LiI has the tendency to interact $O_2$ molecules, whereby some electron charge from $I^-$ ions are transferred to the solvated $O_2$ molecule to form reduced species ($O_2^-$). The reduced species $O_2^-$ coordinates to solvated $Li^+$ cations (migrating from the anode) to form $LiO_2$, followed by a disproportionation process resulting in the formation and deposition of bulk $Li_2O_2$ as discharge product onto the LiI-electrode surface.)

In addition, Li3N; In the second conductor layer, $O_2$ is reduced by electrochemically generated electrons and then reacts with $Li^+$ adsorbed on the surface to form $Li_2O_2$ adsorbed on the surface.

(At the $Li_3N$ electrode surface, $O_2$ molecules are reduced by electrochemically generated electrons and subsequently react serially with the surface-bound $Li^+$ to form adsorbed $Li_2O_2$ which then undergoes an initial surface nucleation followed by a templated secondary growth process.)

Figure 3:
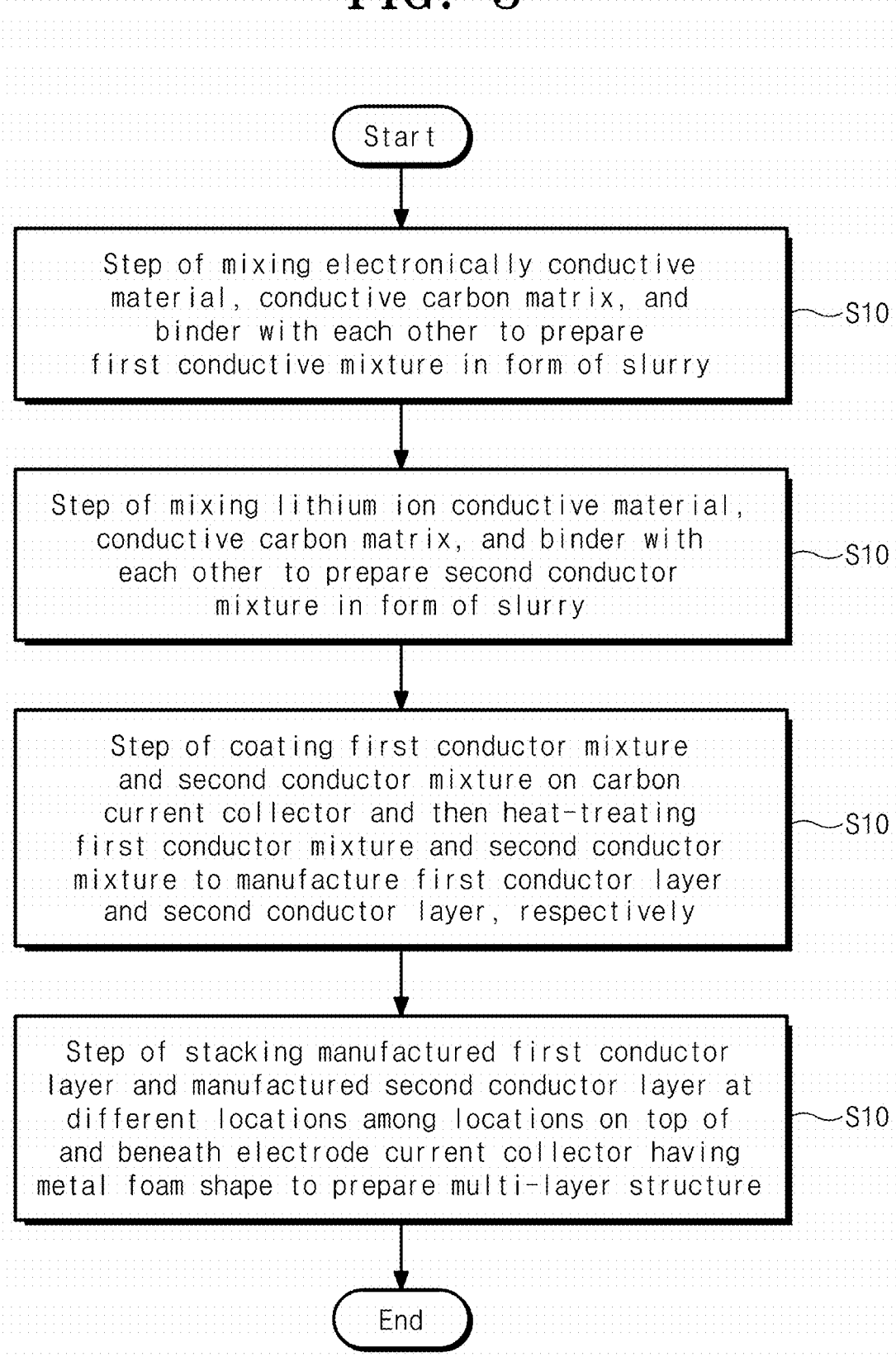
FIG. 3 is a flowchart illustrating a method for manufacturing an air electrode including a multi-layer structure with an extended three-phase boundary according to an embodiment of the inventive concept.

FIG. 3 is a flowchart illustrating a method for manufacturing an air electrode including a multi-layer structure with an extended three-phase boundary according to an embodiment of the inventive concept.

Referring to FIG. 3, a method for manufacturing an air electrode including a multi-layer structure with an extended three-phase boundary according to an embodiment of the inventive concept includes a step (S100) of mixing the electronically conductive material, the conductive carbon matrix, and the binder with each other to prepare a first conductive mixture in a form of a slurry, a step (S200) of mixing the lithium ion conductive material, the conductive carbon matrix, and the binder with each other to prepare a second conductor mixture in the form of the slurry, a step (S300) of coating the first conductor mixture and the second conductor mixture on a carbon current collector and then heat-treating the first conductor mixture and the second conductor mixture to manufacture the first conductor layer and the second conductor layer, respectively, and a step (S400) of stacking the manufactured first conductor layer and the manufactured second conductor layer at the different locations among the locations on top of and beneath the electrode current collector having the metal foam shape to prepare the multi-layer structure.

Step S100 is a step of preparing the conductive mixture in the form of the slurry to form the first conductor layer 210 containing the electronically conductive material on top of or beneath the electrode current collector 100.

Specifically, step S100 may include a step (S110) of mixing the electronically conductive material, the conductive carbon matrix, and the binder in the mass ratio of 4:(3.5-5.5):(0.5-2.5) to form a mixture, and a step (S120) of dispersing the mixture in a solvent.

In this connection, the conductive carbon matrix may be one material selected from the group consisting of natural graphite, artificial graphite, carbon black, acetylene black, Ketjen black, channel black, furnace black, lamp black, summer black, and carbon fiber.

In addition, the binder may be a polymer of polyvinylidene fluoride and hexafluoropropylene (PVDF-HFP), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene butyrene rubber, fluororubber, various copolymers, and the like.

In addition, the solvent may be dimethyl sulfoxide (DMSO), alcohol, N-methylpyrrolidone (NMP), acetone, water, or the like.

In addition, in step S120, the mixture is uniformly dispersed in 100 to 500 μL of the solvent.

Similar to the above, step S200 is a step of preparing the conductive mixture in the form of the slurry to form the second conductor layer 210 containing the lithium ion conductive material on top of or beneath the electrode current collector 100.

Specifically, step S200 includes a step (S210) of mixing the lithium ion conductive material, the conductive carbon matrix, and the binder in the mass ratio of 4:(3.5-5.5):(0.5-2.5) to form a mixture, and a step (S220) of dispersing the mixture in the solvent.

In addition, in step S220, the mixture is uniformly dispersed in 100 to 500 μL of the solvent.

Step S300 is a step of coating the first conductive mixture prepared in step S100 on the first carbon current collector and then heat-treating the first conductive mixture to manufacture the first conductor layer 100, and coating the second conductor mixture prepared in step S200 on the second carbon current collector and then heat-treating the second conductor mixture to manufacture the second conductor layer 200.

In this connection, the carbon current collector, which is carbon having a porous structure having a pore defined therein, is able to use any material known in the art without limitation.

In addition, the carbon current collector may contain one carbon material selected from a group consisting of graphite, carbon fiber, and a carbon nanotube, but the inventive concept may not be limited thereto. A structure and a shape of the carbon current collector may be appropriately adjusted based on a purpose.

In addition, in step S300, the conductor mixture coated on the carbon current collector may be heat-treated, and the heat treatment may be performed for 3 to 7 hours at a sintering temperature of 120° C.

Step S400 is a step of stacking the first conductor layer 210 and the second conductor layer 220 manufactured in step S300 at the different locations among the locations on top of and beneath the electrode current collector 100.

Accordingly, in step S400, the air electrode including the multi-layer structure having the structure in which the first conductor layer 210 and the second conductor layer 220 are respectively stacked on top of and beneath the electrode current collector 100 may be formed. More specifically, the multi-layer structure may include the first multi-layer structure in which the first conductor layer 210 is stacked beneath the electrode current collector 100 and the second conductor layer 220 is stacked on top of the electrode current collector 100.

In addition, the multi-layer structure may include the second multi-layer in which the second conductor layer 220 is stacked on top of the electrode current collector 100 and the first conductor layer 210 is stacked beneath the electrode current collector 100.

Step S400 is a step of heat-treating the conductor mixtures coated on the electrode current collector 100 to form the first conductor layer 210 and the second conductor layer 220 at the different locations among the locations on top of and beneath the electrode current collector 100, respectively.

In this connection, the region beneath the electrode current collector 100 may mean the region adjacent to the separator.

<Example 1> Manufacturing 1 of Air Electrode Including Multi-Layer Structure with Extended Three-Phase Boundary Step S100: LiI, which is the electronically conductive material, Ketjen Black, which is the conductive carbon matrix, and PVDF-HFP, which is the binder, were mixed in a weight ratio of 4:4.5:1.5 to form a mixture, and the mixture was dispersed in 500 μL of NMP to prepare the first conductive mixture.

Step S200: $Li_3N$, which is the lithium ion conductive material, Ketjen Black, which is the conductive carbon matrix, and PVDF-HEP, which is the binder, were mixed in a weight ratio of 4:4.5:1.5 to form a mixture, and the mixture was dispersed in 500 μL of NMP to prepare the second conductive mixture.

Step S300: The prepared first conductive mixture was coated on a first carbon fiber current collector, and the coated first carbon fiber current collector was heat-treated at 120° C. for 5 hours to manufacture the first conductor layer.

In addition, the prepared second conductor mixture was coated on a second carbon fiber current collector, and the coated second carbon fiber current collector was heat-treated at 120° C. for 5 hours to prepare the second conductor layer.

Step S400: The manufactured first conductor layer was stacked beneath a nickel electrode current collector prepared in advance and the manufactured second conductor layer was stacked on top of the nickel electrode current collector to manufacture an air electrode including the first multi-layer structure.

<Example 2> Manufacturing 2 of Air Electrode Including Multi-Layer Structure with Extended Three-Phase Boundary Except that the manufactured first conductor layer is stacked on top of the nickel electrode current collector and the manufactured second conductor layer is stacked beneath the nickel electrode current collector in step S400 of Example 1, an air electrode including the second multi-layer structure was manufactured in the same manner as in Example 1 above.

<Example 3> Manufacturing of Lithium-Air Secondary Battery Using Cathode Including Air Electrode of Example 1

A lithium-air secondary battery was manufactured using lithium metal as the anode, using a lithium salt non-aqueous electrolyte containing dimethyl sulfoxide (DMSO) in which 140 μL of $LiCF_3SO_3$ is dissolved as the electrolyte, using the glass fiber as the separator, and using the air electrode (in which the first conductor layer located beneath the nickel electrode current collector) of Example 1 as the cathode.

In the lithium-air secondary battery of Example 3, the lithium anode is disposed on a bottom layer, and the separator and the air electrode of Example 1 are sequentially disposed on the lithium anode. In addition, the lithium salt non-aqueous electrolyte is included to ensure wettability of the lithium-air secondary battery.

That is, the lithium-air secondary battery of Example 3 has the DINN structure composed of the separator/the first conductor layer containing the electronically conductive material/the electrode current collector/the second conductor layer containing the lithium ion conductive material.

<Example 4> Manufacturing of Lithium-Air Secondary Battery Using Cathode Including Air Electrode of Example 2

A lithium-air secondary battery was manufactured using the lithium metal as the anode, using the lithium salt non-aqueous electrolyte containing dimethyl sulfoxide (DMSO) in which 140 μL of $LiCF_3SO_3$ is dissolved as the electrolyte, using the glass fiber as the separator, and using the air electrode (in which the second conductor layer located beneath the nickel electrode current collector) of Example 2 as the cathode.

In the lithium-air secondary battery of Example 4, the lithium anode is disposed on a bottom layer, and the separator and the air electrode of Example 2 are sequentially disposed on the lithium anode. In addition, the lithium salt non-aqueous electrolyte is included to ensure wettability of the lithium-air secondary battery.

That is, the lithium-air secondary battery of Example 4 has the DNNI structure composed of the separator/the second conductor layer containing the lithium ion conductive material/the electrode current collector/the first conductor layer containing the electronically conductive material.

<Comparative Examples 1, 2, and 3>
Manufacturing of Lithium-Air Secondary Battery Using Air Electrode Containing Ketjen Black Except for replacing the second conductor layer with Ketjen Black in the air electrode of Example 1 included in Example 3, a lithium-air secondary battery was manufactured in the same manner as in Example 3 (Comparative Example 1, DINK).

The lithium-air secondary battery of Comparative Example 1 has a DINK structure composed of the separator/the first conductor layer/the electrode current collector/Ketjen black.

Except for replacing the first conductor layer with Ketjen Black and replacing the second conductor layer with the first conductor layer in the air electrode of Example 1 included in Example 3, a lithium-air secondary battery was manufactured in the same manner as in Example 3 (Comparative Example 2, DKNI).

The lithium-air secondary battery of Comparative Example 2 has a DKNI structure composed of the separator/Ketjen black/the electrode current collector/the first conductor layer.

Except for replacing the first conductor layer with Ketjen Black and replacing the second conductor layer with the Ketjen Black in the air electrode of Example 1 included in Example 3, a lithium-air secondary battery was manufactured in the same manner as in Example 3 (Comparative Example 3, DKNK).

The lithium-air secondary battery of Comparative Example 3 has a DKNK structure composed of the separator/Ketjen black/the electrode current collector/Ketjen black.

<Comparative Examples 4 and 5> Manufacturing of Lithium-Air Secondary Battery Using Air Electrode Containing Ketjen Black Except for replacing the first conductor layer with Ketjen Black in the air electrode of Example 2 included in Example 4, a lithium-air secondary battery was manufactured in the same manner as in Example 4 (Comparative Example 4, DNNK).

The lithium-air secondary battery of Comparative Example 4 has a DNNK structure composed of the separator/the second conductor layer/the electrode current collector/Ketjen black.

Except for replacing the second conductor layer with Ketjen Black and replacing the first conductor layer with the second conductor layer in the air electrode of Example 2 included in Example 4, a lithium-air secondary battery was manufactured in the same manner as in Example 4 (Comparative Example 5, DKNN).

The lithium-air secondary battery of Comparative Example 4 has a DKNN structure composed of the separator/Ketjen black/the electrode current collector/the second conductor layer.

<Experimental Example 1> XRD Analysis Result of First Conductor Layer and Second Conductor Layer Manufactured Through Example 1

Figure 4A:
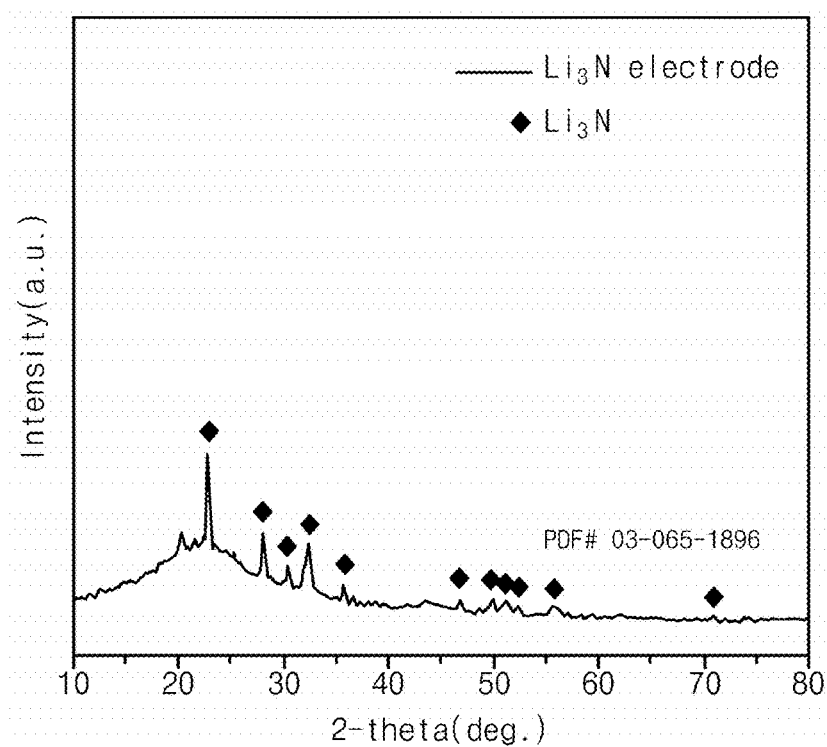
FIGS. 4A and 4B are diagrams illustrating XRD patterns of a first conductor layer and a second conductor layer of an air electrode including a multi-layer structure with an extended three-phase boundary according to an embodiment of the inventive concept.
Figure 4B:
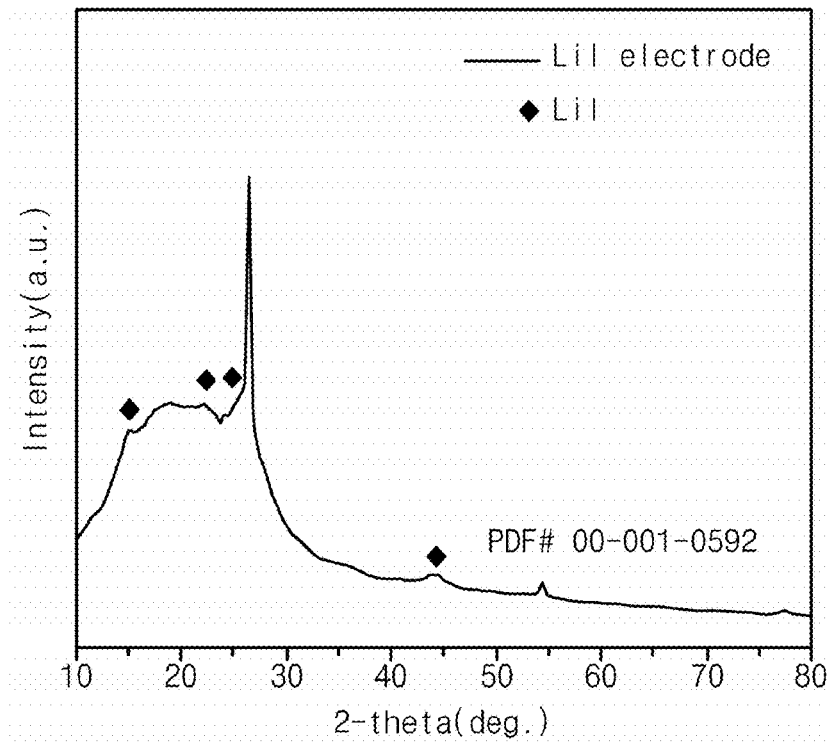

To identify the conductor layers of the air electrode including the multi-layer structure with the extended three-phase boundary according to the inventive concept, XRD patterns of the first conductor layer and the second conductor layer of the air electrode manufactured through Example 1 were analyzed, and an analysis result is shown in FIGS. 4A and 4B.

FIGS. 4A and 4B are diagrams illustrating XRD patterns of a first conductor layer and a second conductor layer of an air electrode including a multi-layer structure with an extended three-phase boundary according to an embodiment of the inventive concept.

As shown in FIGS. 4A and 4B, in the second conductor layer (the $Li_3N$ electrode) containing the lithium ion conductive material, a peak of $Li_3N$ was observed. In addition, in the first conductor layer (the LiI electrode) containing the electronically conductive material, a peak of LiI was observed.

<Experimental Example 2> Electrochemical Activity Evaluation of Example 3 and Example 4

To evaluate electrochemical activity performances of the lithium-air secondary batteries manufactured in Example 3 and Example 4, a cyclic voltammetry and an electrochemical impedance spectroscopy were used.

The cyclic voltammetry was performed using a WonATech battery test system under a condition of a voltage range from 2 to 4.5 V and a scan rate of 0.1 mV/s, and the impedance spectroscopy was performed in an Iviumstat Electrochemical Workstation in a frequency range from 10 kHz to 100 MHz with a 10 My AC voltage. Results of the cyclic voltammetry and the impedance spectroscopy are shown in FIGS. 5A and 5B.

Figure 5A:
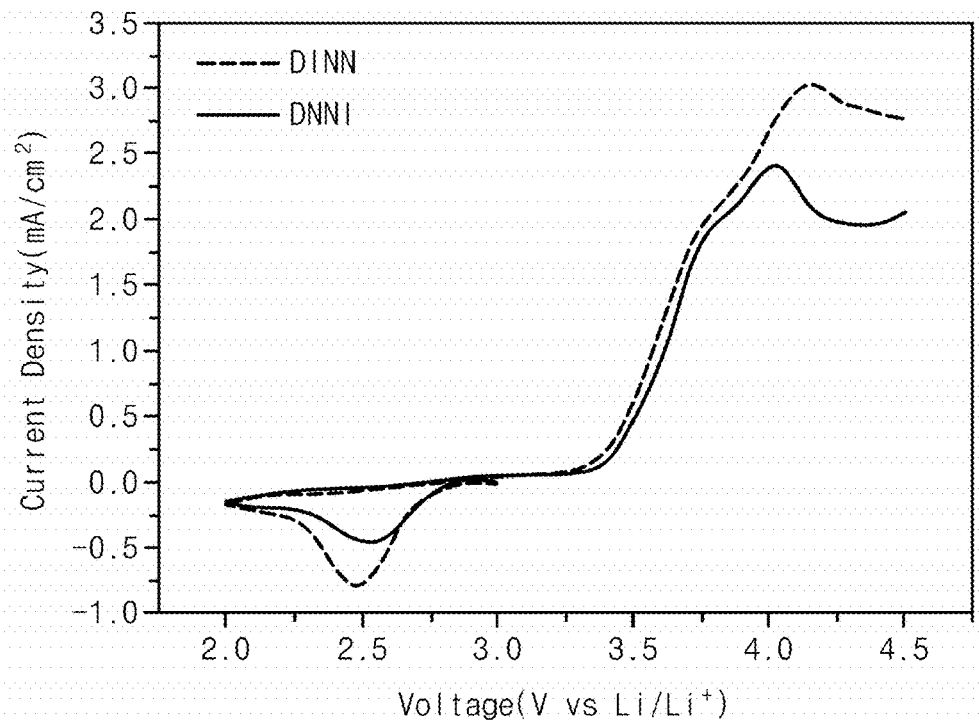
FIGS. 5A and 5B show graphs showing cyclic voltage and current curves and an electrochemical impedance spectroscopy result of lithium-air secondary batteries according to Example 3 and Example 4 of the inventive concept.
Figure 5B:
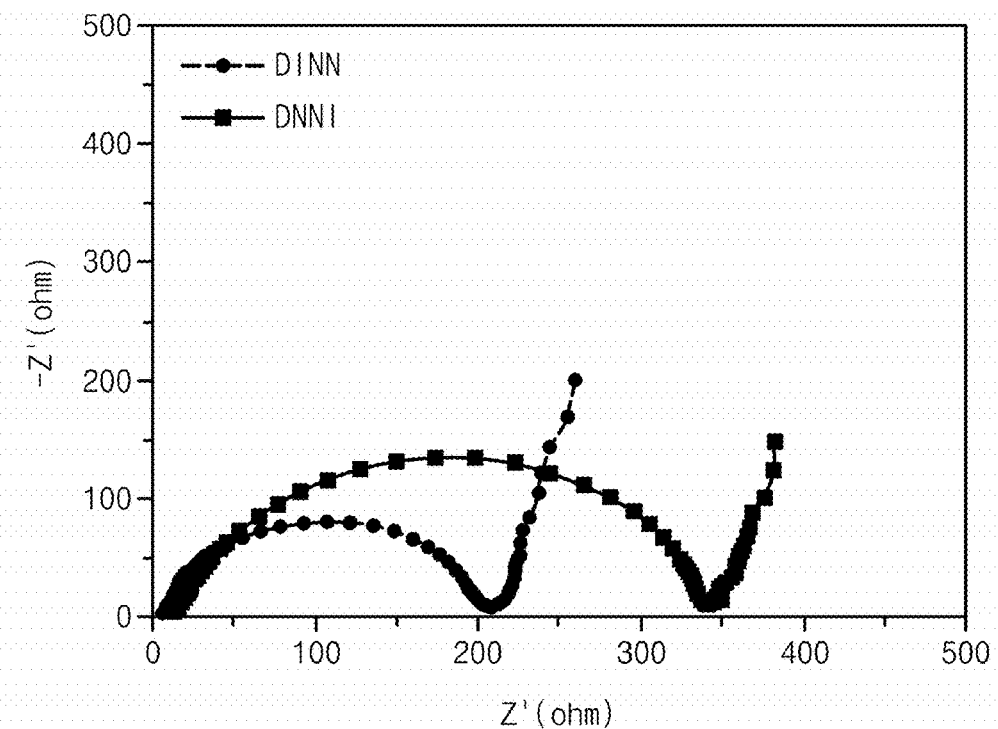

FIGS. 5A and 5B show graphs showing cyclic voltage and current curves and an electrochemical impedance spectroscopy result of lithium-air secondary batteries according to Example 3 and Example 4 of the inventive concept.

As shown in FIG. 5A, the lithium-air secondary battery of Example 3 having the DINN structure showed higher current density in both cathode and anode regions, and it was identified that the lithium-air secondary battery of Example 3 having the DINN structure has a higher current density compared to Example 4 having the DNNI structure.

That is, Example 3 has better activity in the oxygen reduction reaction (ORR) and the oxygen evolution reaction (OER) than Example 4.

As shown in FIG. 5B, a region indicated by a semicircle means a charge transfer resistance, and a decrease in the semicircular region means a decrease in activation energy required for the electrochemical reaction and an increase in the current density.

That is, it is identified that Example 4 having the DNNI structure has a higher ohmic resistance than Example 3, which may be determined because movements of the lithium ions and the electrons are more limited than Example 3.

<Experimental Example 3> Charging/Discharging Performance Test Result of Example 3 and Example 4

To compare and analyze charging and discharging performances of the lithium-air secondary batteries manufactured in Example 3 and Example 4, a capacity-voltage profile, lifespan characteristics, and initial cycle overvoltage characteristics were evaluated using the WonATech battery test system within the voltage range from 2 to 4.5 V at 25° C., and an evaluation result is shown in FIG. 6.

Figure 6A:
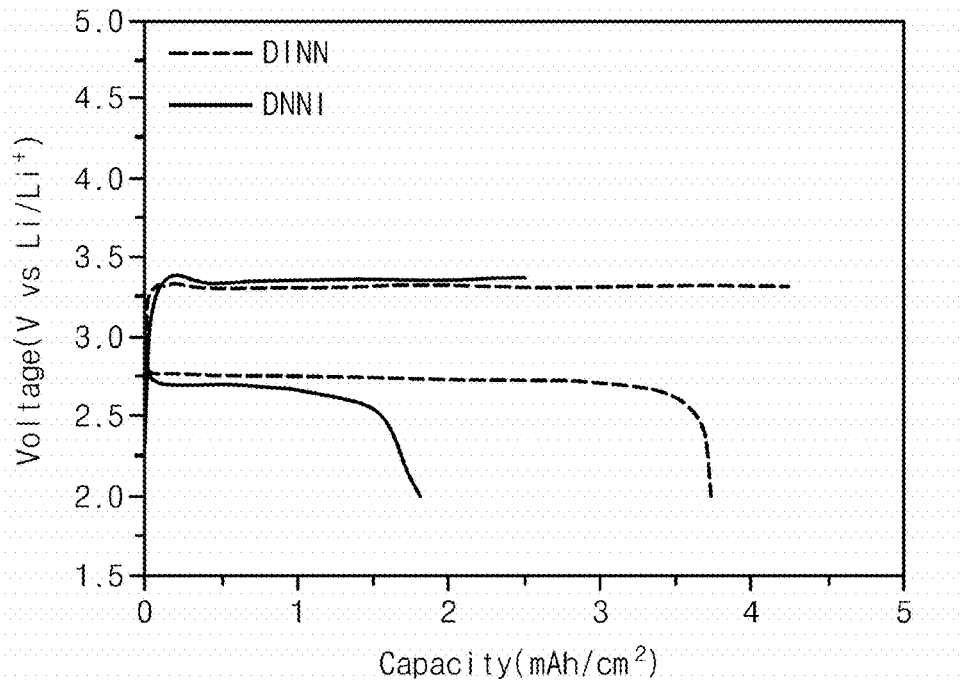
FIGS. 6A, 6B and 6C show graphs showing capacity-voltage profiles and lifespan characteristics of lithium-air secondary batteries according to Example 3 and Example 4 of the inventive concept.
Figure 6B:
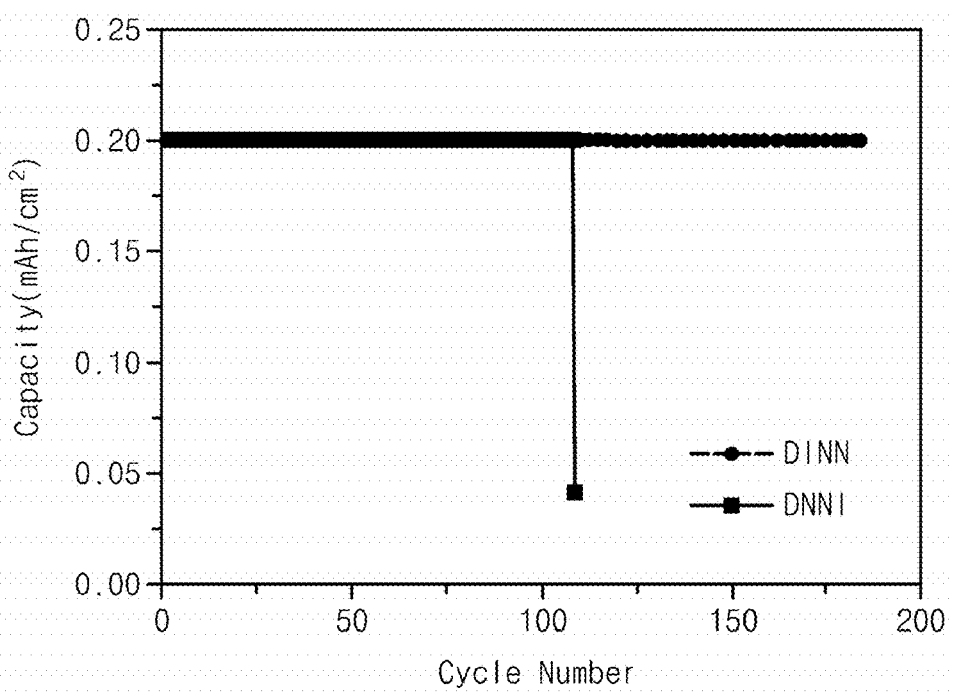
Figure 6C:
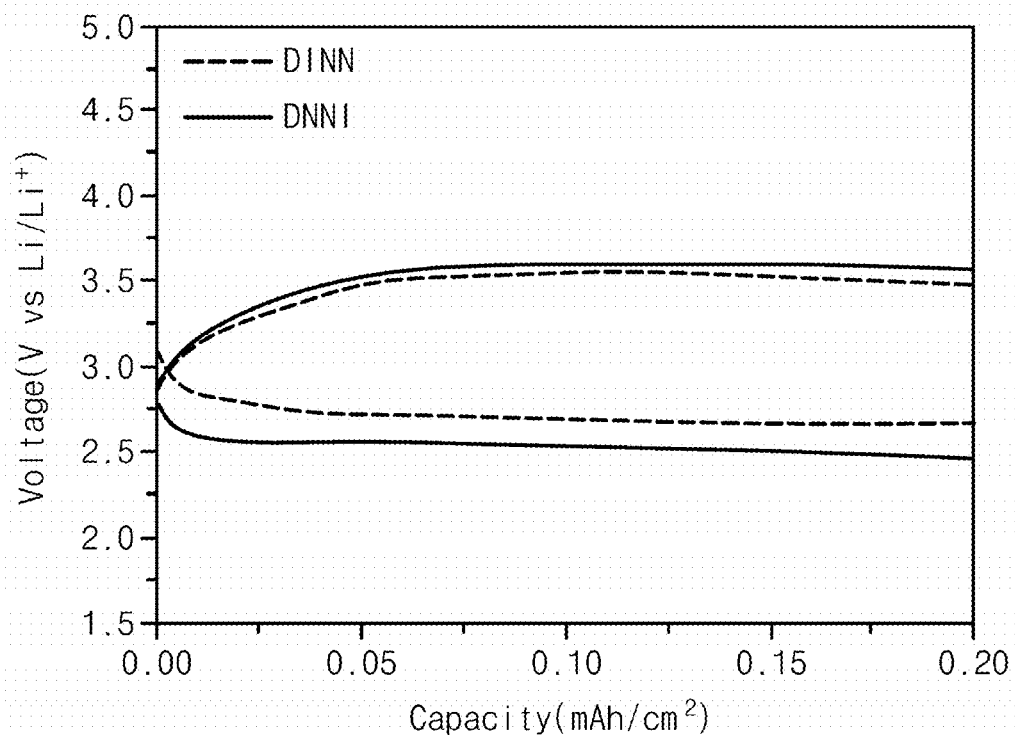

FIGS. 6A, 6B and 6C show graphs showing capacity-voltage profiles and lifespan characteristics of lithium-air secondary batteries according to Example 3 and Example 4 of the inventive concept.

As shown in FIG. 6A, Example 3 having the DINN structure had a maximum discharging capacity of 3.741 mAh/cm$^2$, which was twice or more of the maximum discharging capacity of Example 4 having the DNNI structure of 1.808 mAh/cm$^2$.

In addition, energy efficiencies of Example 3 and Example 4 were 83.22% and 79.78%, respectively, so that it was identified that the energy efficiency of Example 4 is lower than that of Example 3.

As shown in FIG. 6B, lifespan characteristics of Example 3 having the DINN structure were maintained for 184 cycles or more without showing any signs of capacity degradation, and a battery life of Example 4 having the DNNI structure was maintained up to 109 cycles and then rapidly faded.

As shown in FIG. 6C, the DINN structure shows a lower overvoltage than the DNNI, which is resulted from the excellent oxygen reduction activity (ORR) and oxygen evolution activity (OER) of the DINN structure.

<Experimental Example 4> Charging/Discharging Performance Test Result of Example 3, Example 4, and Comparative Examples 1 to 5

Figure 7A:
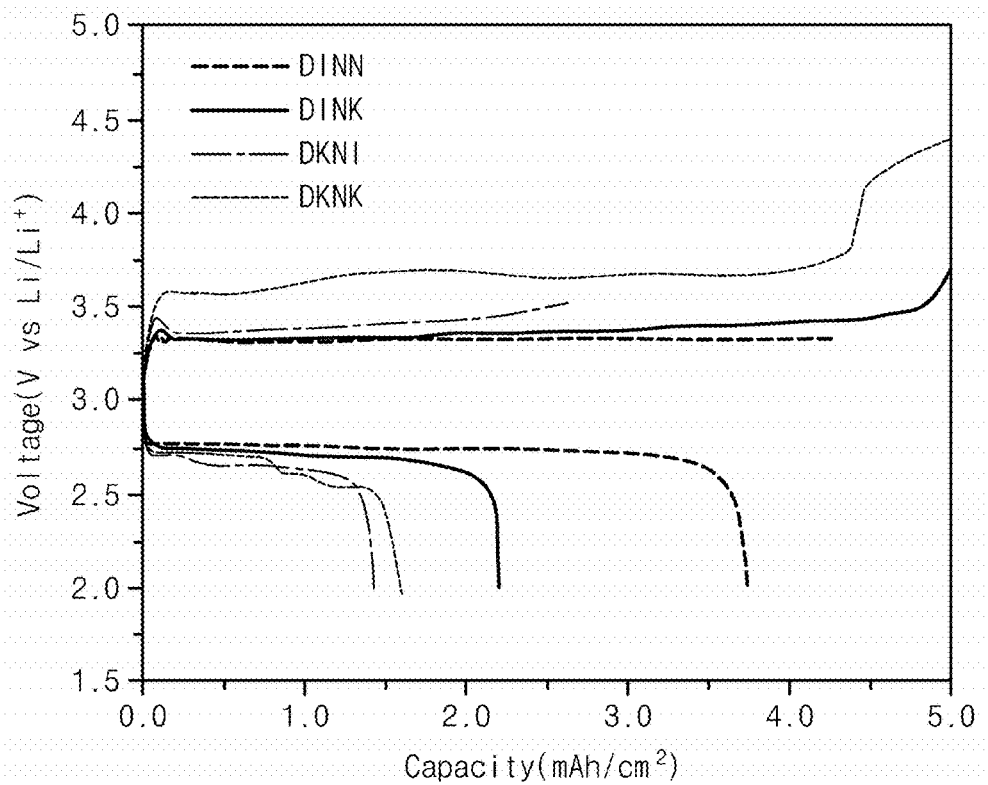
FIGS. 7A and 7B show graphs comparing capacity-voltage profiles of lithium-air secondary batteries according to Examples 3 and 4 of the inventive concept and lithium-air secondary batteries according to Comparative Examples 1 to 5.
Figure 7B:
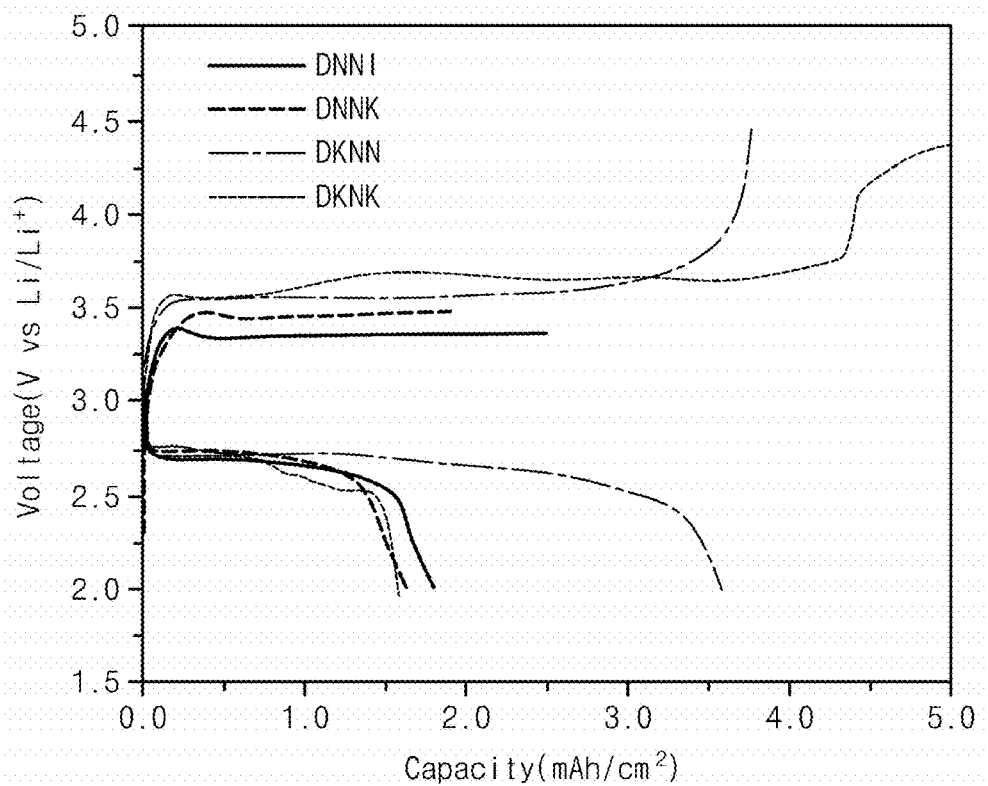

To compare and analyze charging and discharging performances of the lithium-air secondary batteries manufactured in Example 3, Example 4, and Comparative Examples 1 to 5, the capacity-voltage profile was evaluated using the WonATech battery test system at 25° C., within the voltage range from 2 to 4.5 V, and a current density of 0.1 mAh/cm$^2$, and an evaluation result is shown in FIGS. 7A and 7B.

FIGS. 7A and 7B show graphs comparing capacity-voltage profiles of lithium-air secondary batteries according to Examples 3 and 4 of the inventive concept and lithium-air secondary batteries according to Comparative Examples 1 to 5.

FIG. 7A is a graph showing a result for Example 3 and Comparative Examples 1, 2, and 3, and FIG. 7B is a graph showing a result for Example 4 and Comparative Examples 3, 4, and 5.

As shown in FIGS. 7A and 7B, the lithium-air secondary battery of Example 3 and the lithium-air secondary battery of Comparative Example 5 respectively having the DINN structure and the DKNN structure in which the second conductor layer is disposed on top of the nickel electrode current collector showed high discharging capacity.

In addition, throughout a charging process, the lithium-air secondary batteries of Examples 3, Example 4, Comparative Example 1, and Comparative Example 2 including the first conductor layer showed flat charge stability curves equal to or lower than 3.5 V resulting from strong solvation of I− in the electrolyte. That is, it was identified that the lithium-air secondary batteries showed stable lifespan characteristics while maintaining a charging voltage thereof to be equal to or lower than 3.5 V by the first conductor layer.

In addition, the strong solvation described above may increase oxidation and reduction reactions of I− and I3− at a low and stable decomposition potential, thereby oxidizing the reaction product more effectively.

<Experimental Example 5> Microstructure Evaluation after Charging/Discharging Performance Test of Lithium-Air Secondary Batteries Manufactured in Example 3 and Example 4

After the charging and discharging performance test, to observe surfaces of the first conductor layer, the nickel electrode current collector, and the second conductor layer in the lithium-air secondary batteries manufactured in Example 3 and Example 4, surface images were acquired through a scanning electron microscope, and results thereof are shown in FIGS. 8A, 8B, 9A and 9B.

Figure 8A:
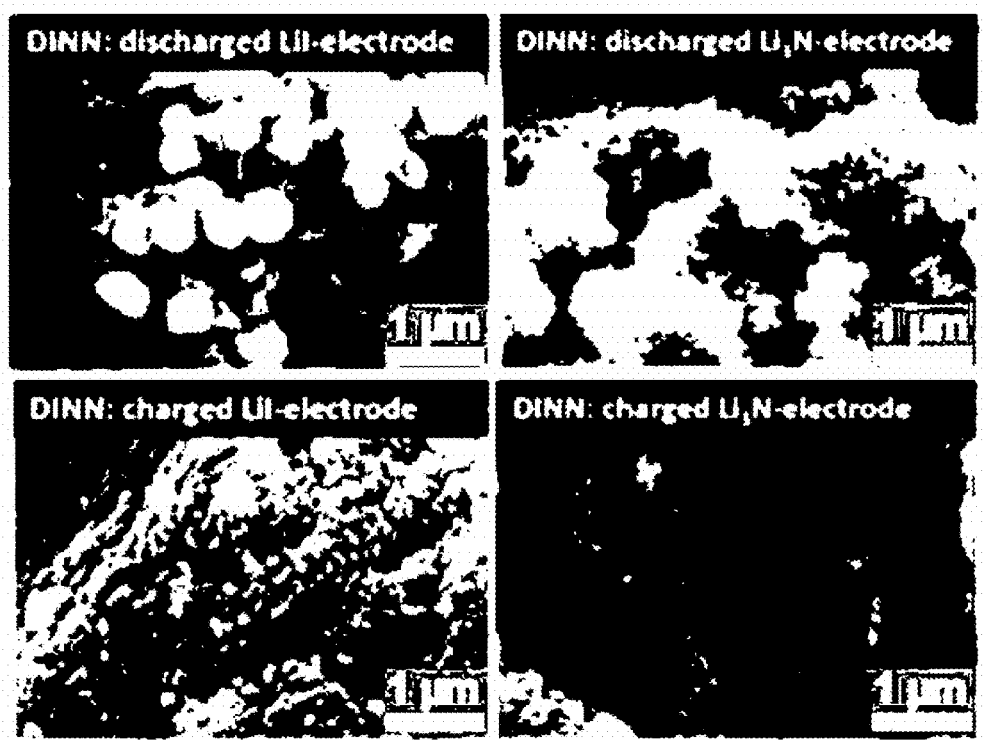
FIGS. 8A and 8B are views showing SEM images of surfaces of a first conductor layer and a second conductor layer in charged and discharged states of lithium-air secondary batteries according to Examples 3 and 4 of the inventive concept.
Figure 8B:
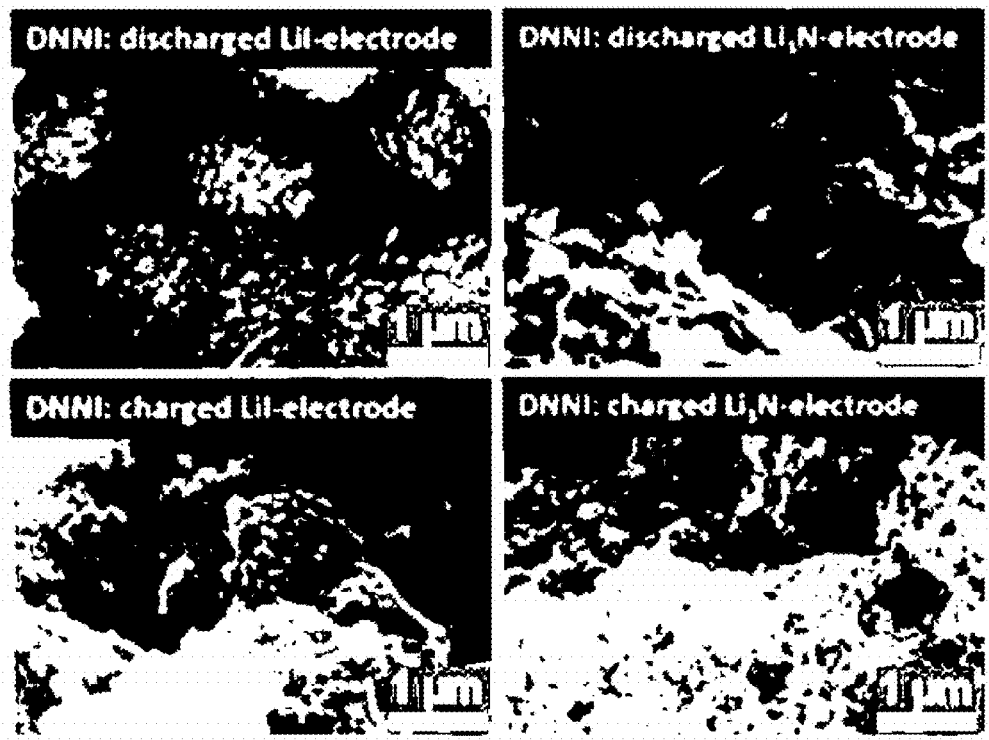
Figure 9A:
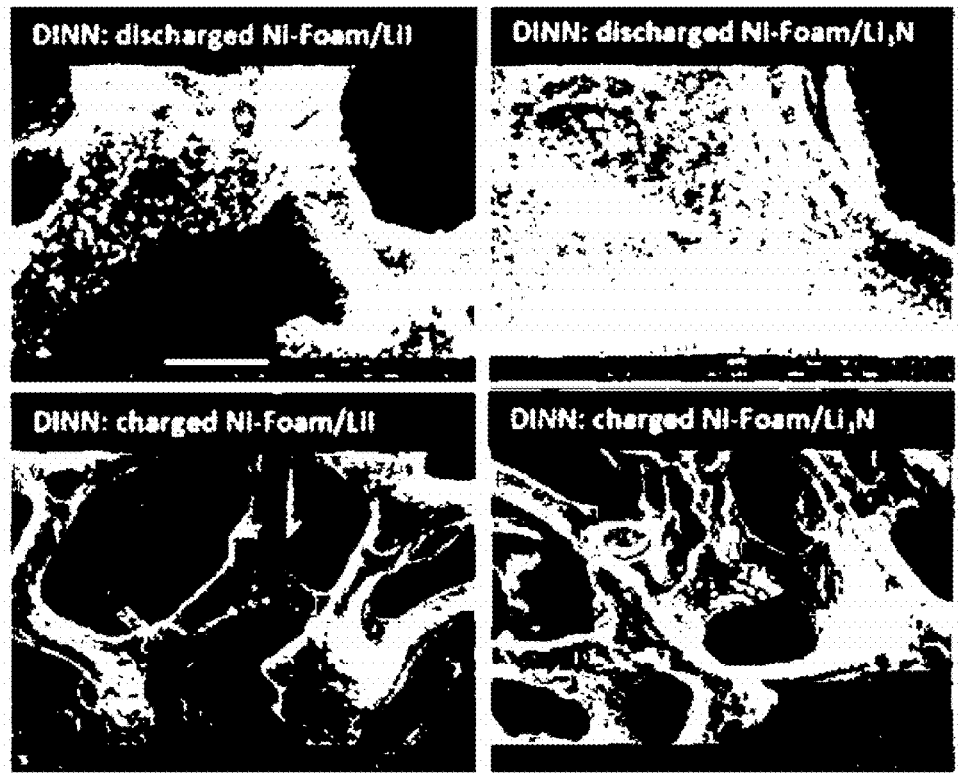
FIGS. 9A and 9B are views showing SEM images of a surface of a nickel electrode current collector adjacent to a first conductor layer and a second conductor layer in FIGS. 8A and 8B.
Figure 9B:
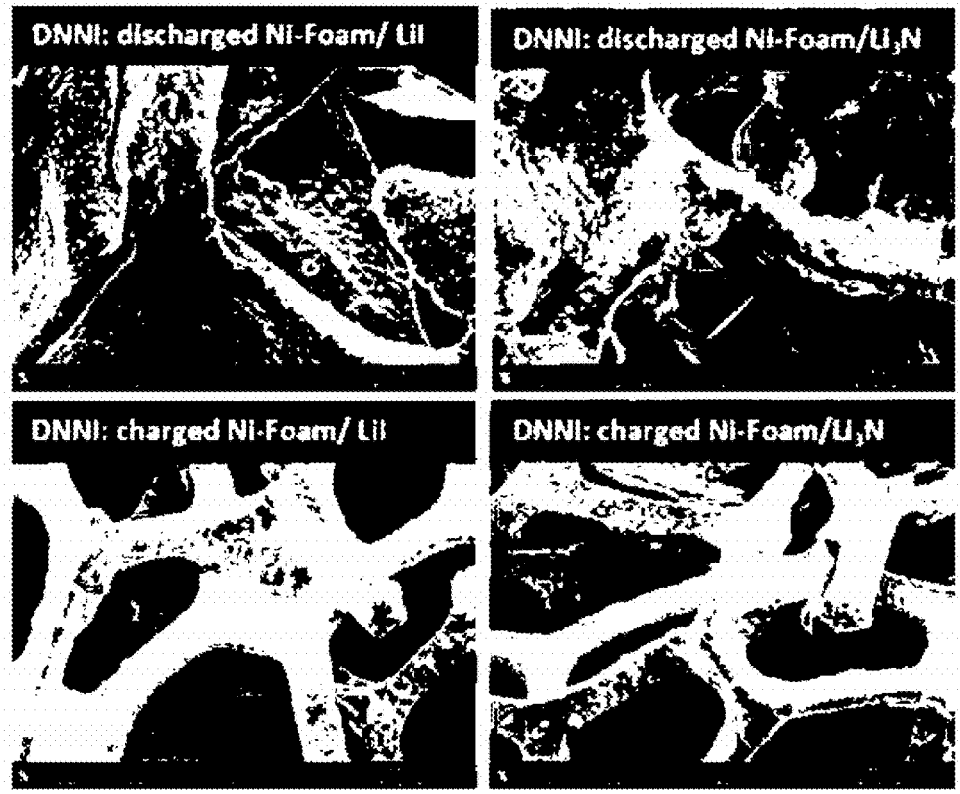

FIGS. 8A and 8B are views showing SEM images of surfaces of a first conductor layer and a second conductor layer in charged and discharged states of lithium-air secondary batteries according to Examples 3 and 4 of the inventive concept, and FIGS. 9A and 9B are views showing SEM images of a surface of a nickel electrode current collector adjacent to a first conductor layer and a second conductor layer in FIGS. 8A and 8B.

As shown in FIGS. 8A and 8B, it may be identified that the porous toroidal reaction product through the solution mechanism was formed on the surface of the first conductor layer (the LiI electrode) in Example 3 having the DINN structure in a discharged state. On the other hand, it may be identified that the reaction product in the form of the thin film through the surface mechanism was formed on the surface of the second conductor layer (the LiN electrode) in Example 3 having the DINN structure.

It was identified that, in Example 3 having the DINN structure in a charged state, as the toroidal reaction product created through the solution mechanism and the reaction product in the form of the film created through the surface mechanism was decomposed after the charging process is completely terminated, the surfaces of the first conductor layer (the LiI electrode) and the second conductor layer (the Li3N electrode) were restored to original states thereof when the charging was completed.

As shown in FIGS. 8A and 8B, it may be seen that a thick toroidal reaction product through the solution mechanism was formed on the surfaces of the first conductor layer (the LiI electrode) and the second conductor layer (the LiN electrode) in Example 4 having the DNNI structure in a discharged state. This is determined to be resulted from low reaction rates of the reactants.

Accordingly, it is determined that the lithium-air secondary battery of Example 3 having the DINN structure may promote the diffusion of the lithium ions and the electrons to be performed in the both directions, and has a behavior of promoting nucleation of the reaction product through the expansion of the reaction region of the reactants.

In addition, it is determined that the lithium-air secondary battery of Example 4 having the DNNI structure may promote the movement of the electrons to the lithium anode, and has the behavior of promoting the nucleation of the reaction product as the reaction rates of the reactants are lowered.

As shown in FIGS. 9A and 9B, as a secondary interaction between oxygen and the lithium ions diffused from the electrolyte occurs, the reaction products created through the surface mechanism and the solution mechanism were observed in a surface region of the nickel electrode current collector adjacent to the first conductor layer (the LiI electrode) and the second conductor layer (the Li3N electrode) of Examples 3 and 4 in the discharged state.

In addition, the reaction products formed in the surface region of the nickel electrode current collector were all decomposed after the charging process.

<Experimental Example 6> XPS Spectra after Charging/Discharging Performance Test of Lithium-Air Secondary Batteries Manufactured in Example 3 and Example 4

XPS spectra were obtained using a X-ray photoelectron spectroscopy (XPS) for the lithium-air secondary batteries of Example 3 and Example 4, and a result thereof is shown in FIGS. 10A to 10F.

FIGS. 10A to 10F show graphs of surfaces of a first conductor layer and a second conductor layer measured using a X-ray photoelectron spectroscopy after charging and discharging of lithium-air secondary batteries according to Examples 3 and 4 of the inventive concept.

Figure 10A:
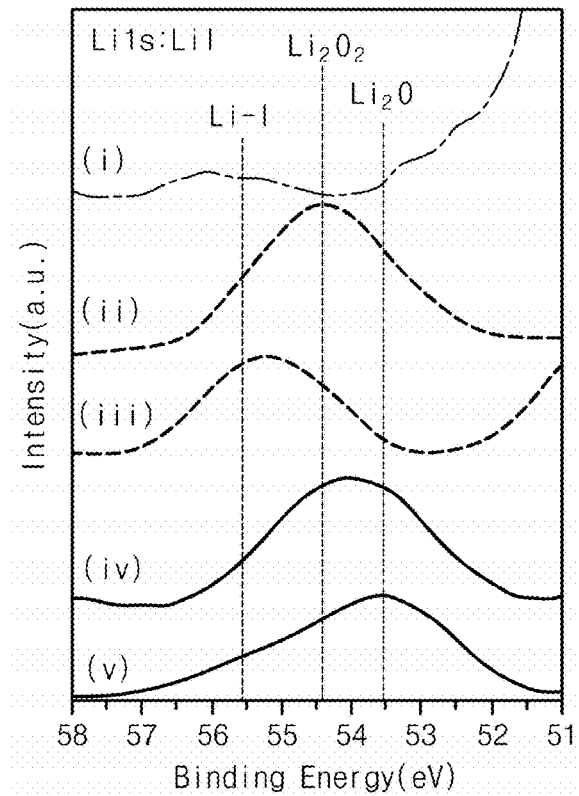
FIGS. 10A to 10F show graphs of surfaces of a first conductor layer and a second conductor layer measured using a X-ray photoelectron spectroscopy after charging and discharging of lithium-air secondary batteries according to Examples 3 and 4 of the inventive concept.
Figure 10B:
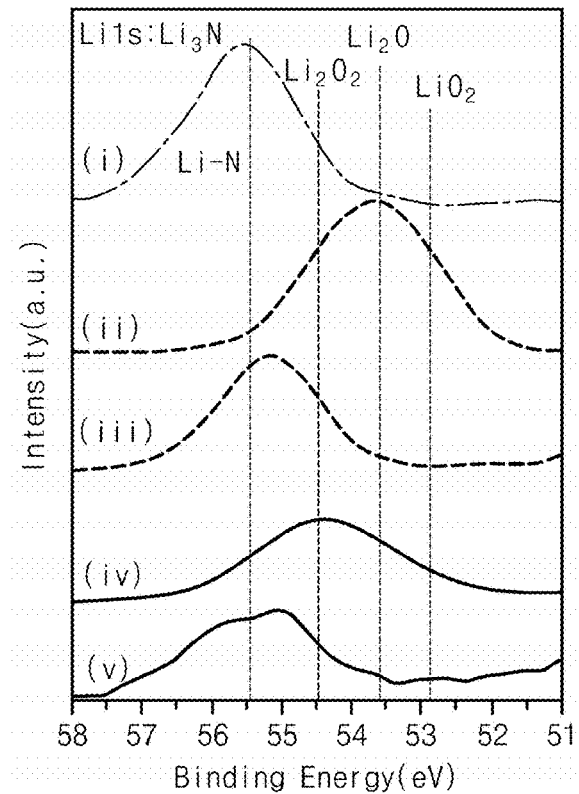

Specifically, FIGS. 10A and 10B are diagrams respectively illustrating XPS spectra of the first conductor layer (LiI) and the second conductor layer ($Li_3N$) under conditions including Example 3 having the DINN structure in an initial state (I) and the discharged state (II), Example 3 having the DINN structure in the charged state (III), Example 4 having the DNNI structure in the discharged state (IV), and Example 4 having the DNNI structure in the charged state (V).

Figure 10C:
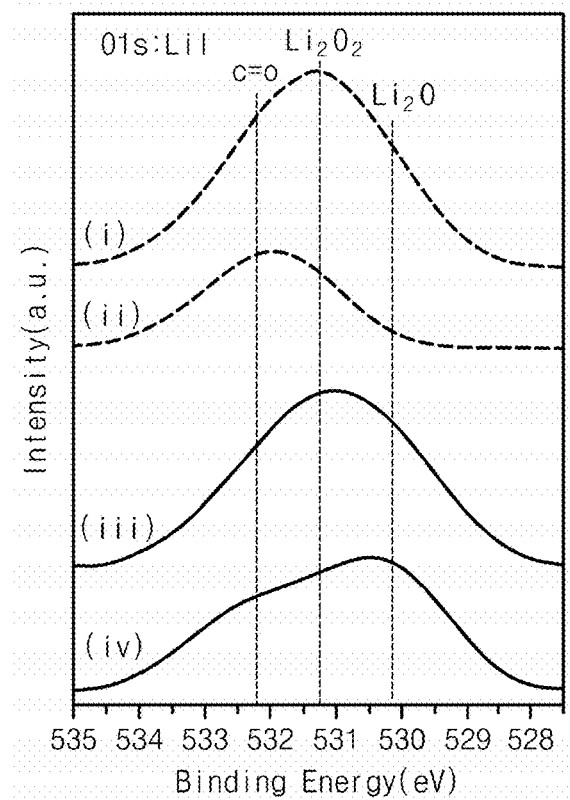
Figure 10D:
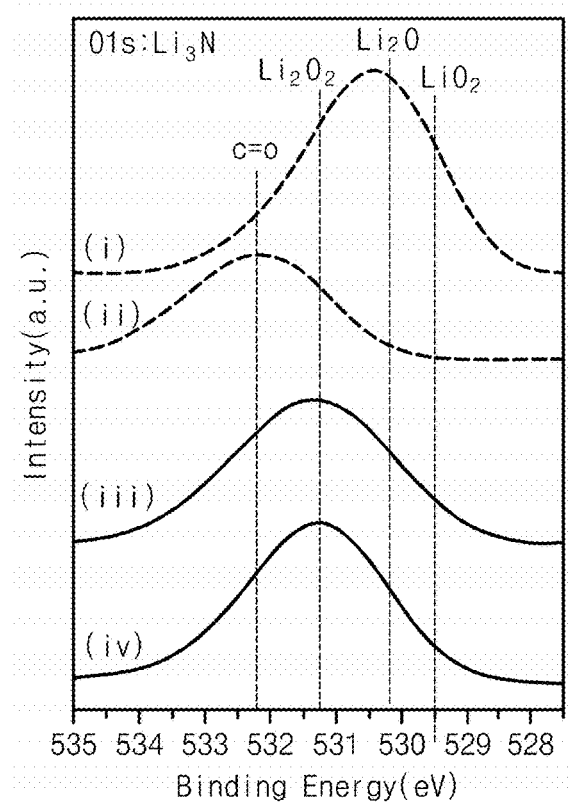

FIGS. 10C and 10D are diagrams respectively illustrating XPS spectra of the first conductor layer (LiI) and the second conductor layer ($Li_3N$) under conditions including Example 3 having the DINN structure in the discharged state (I), Example 3 having the DINN structure in the charged state (II), Example 4 having the DNNI structure in the discharged state (III), and Example 4 having the DNNI structure in the charged state (IV).

As shown in FIGS. 10A, 10B, 10C, and 10D, in the first conductor layer (LiI) of Example 3 and Example 4 in the discharged state respectively having the DINN structure and the DNNI structure, a peak of $Li_2O$, which is the reaction product formed by the solution mechanism, was observed, and $LiO_2$ was not observed as $LiO_2$ was solvated.

In addition, in the second conductor layer ($Li_3N$) of Example 3 and Example 4 in the discharged state respectively having the DINN structure and the DNNI structure, peaks of $Li_2O_2$, $Li_2O$, and $LiO_2$, which are the reaction products formed by the surface mechanism, were observed.

In addition, in the first conductor layer (LiI) and the second conductor layer ($Li_3N$) of Example 3 having the DINN structure in the charged state, it was observed that the peaks of $Li_2O_2$, $Li_2O$, and $LiO_2$, which are the reaction products, disappeared. This is determined to reflect the decomposition of the reaction product and recovery of the electrode surface.

In addition, in the first conductor layer (LiI) and the second conductor layer ($Li_3N$) of Example 4 having the DNNI structure in the charged state, no substantial change in the peak of the reaction product was observed.

Figure 10E:
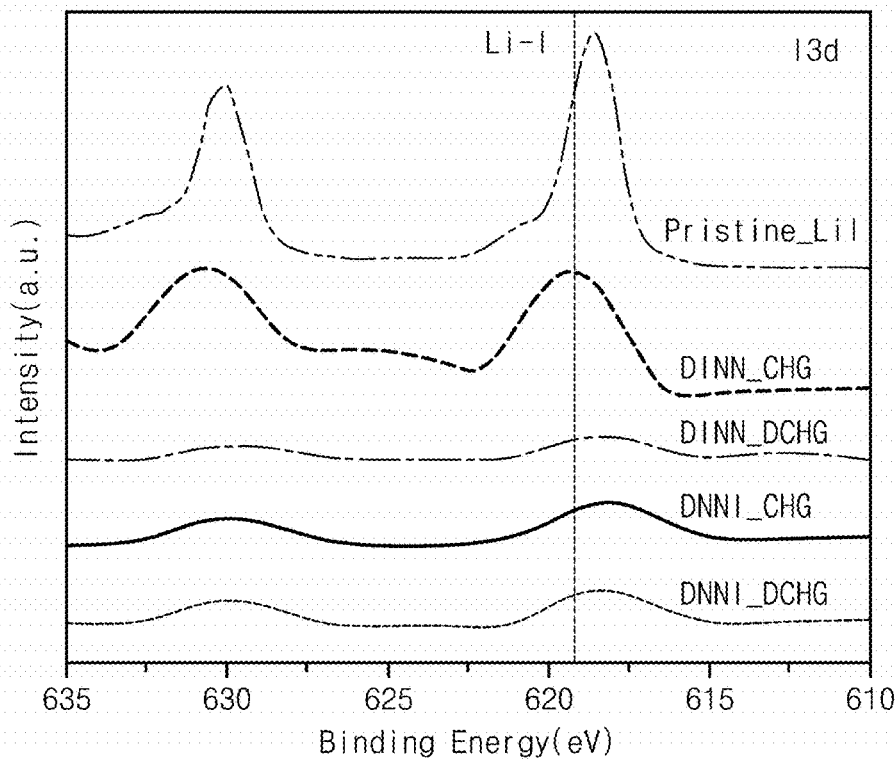
Figure 10F:
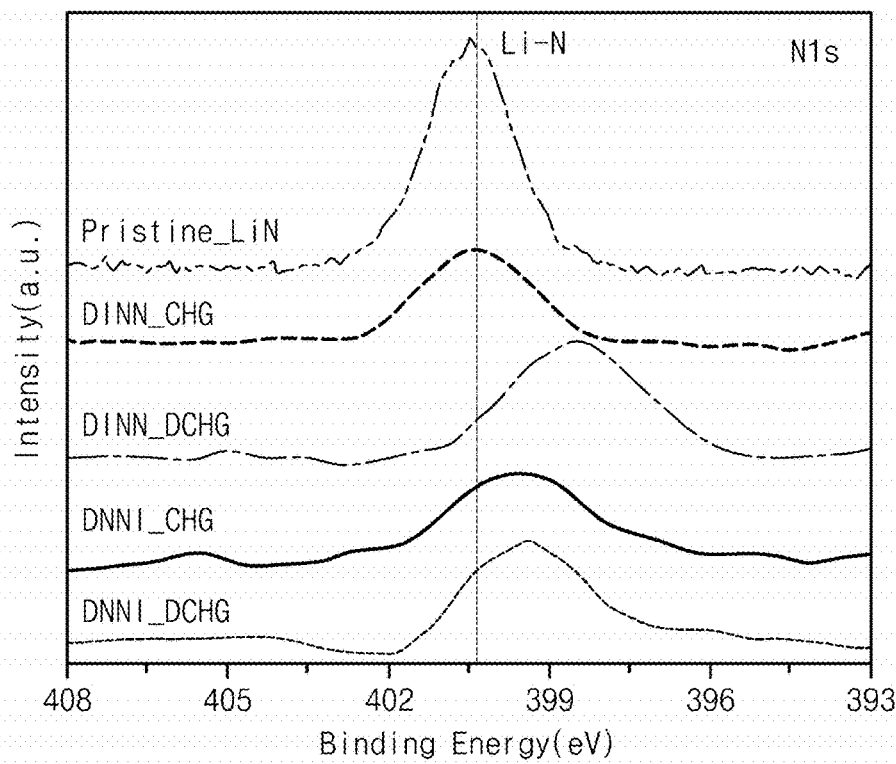

FIG. 10E is a diagram illustrating XPS spectra of the LiI electrode (the first conductor layer) of the DNNI and the DNNI in the charged state and the discharged state, and FIG. 10F is a diagram illustrating XPS spectra of the Li3N electrode in the charged state and the discharged state.

As shown in FIG. 10E, while a peak of Pristine LiI and a peak and an intensity of DNNI-charge/discharge hardly changed, a peak shift resulted from an interaction of I and O atoms occurred in the DINN system. Therefore, it is determined that the DINN system is more excellent in the reaction between LiI and $O_2$.

As shown in 10F, while the peak of Pristine Li3N hardly changed in the DNNI, the change in the peak of Pristine Li3N showed a reversible appearance in the DINN. Based on the above data, it is determined that the charging and the discharging (the formation—the decomposition of the reaction products) in the DINN are more reversible.

Figure 11:
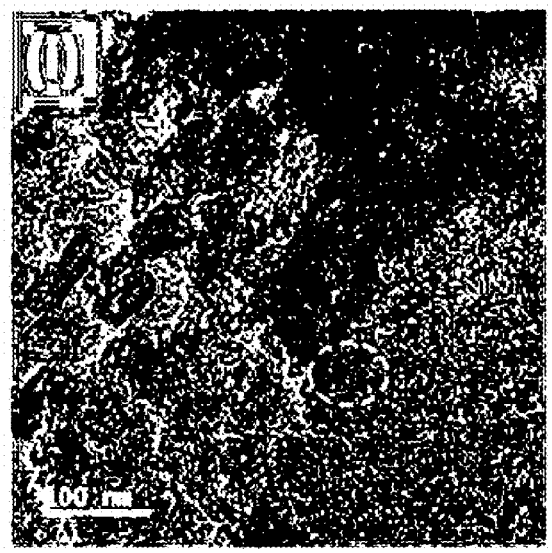
FIG. 11 shows HRTEM images and SAED patterns of Li3N (i and ii) and a LiI electrode (iii and iv) after discharging in a DINN system.
Figure 11:
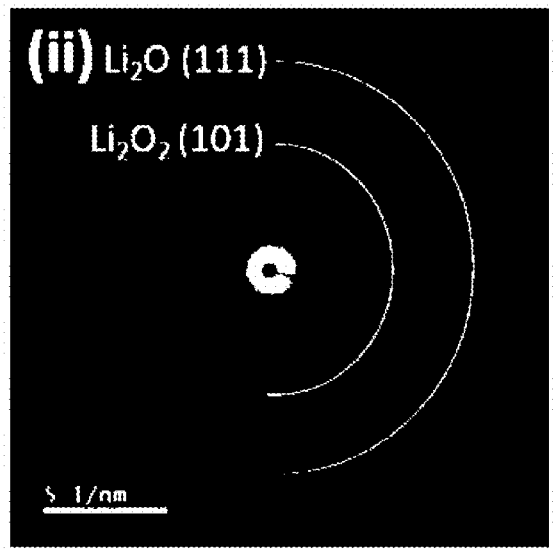
Figure 11:
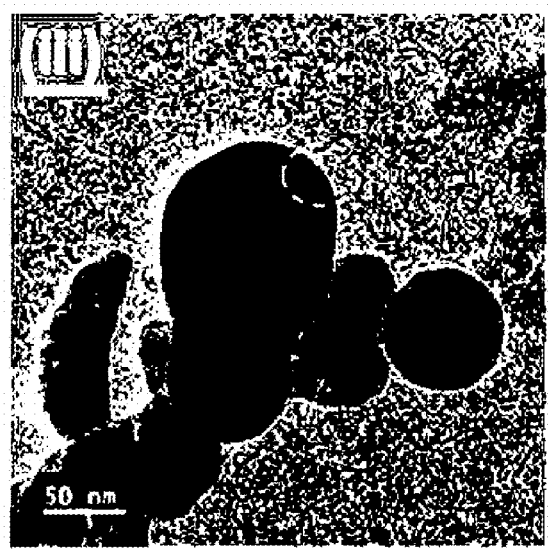
Figure 11:
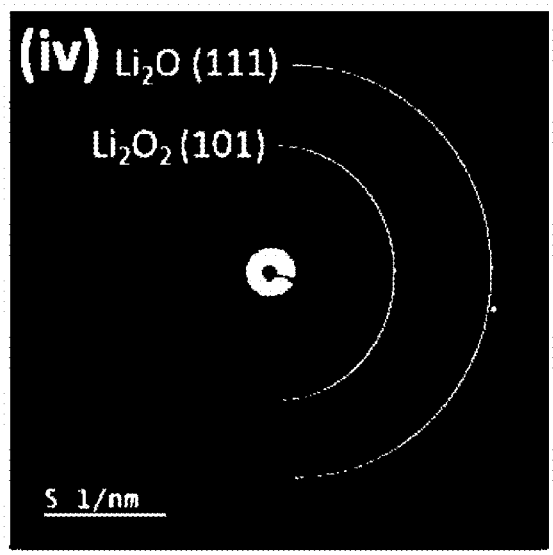

FIG. 11 shows HRTEM images and SAED patterns of $Li_3N$ (i and ii) and a LiI electrode (iii and iv) after discharging in a DINN system.

Figure 12:
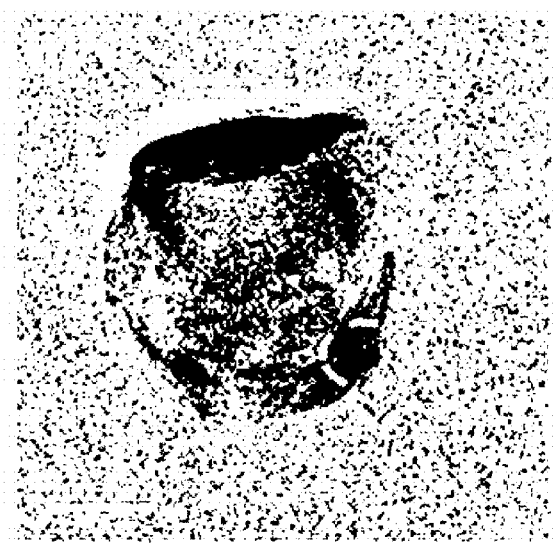
FIG. 12 shows HRTEM images and SAED patterns Li3N (i and ii) and a LiI electrode (iii and iv) after discharging in a DNNI system.
Figure 12:
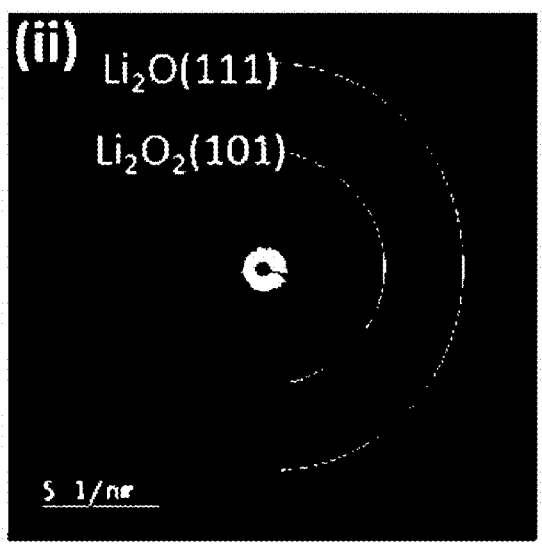
Figure 12:
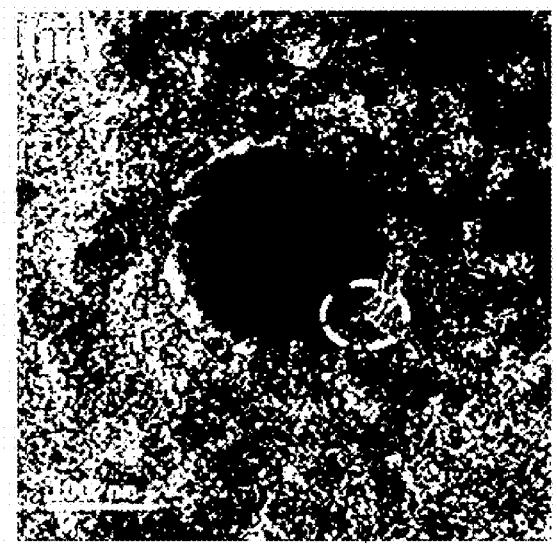
Figure 12:
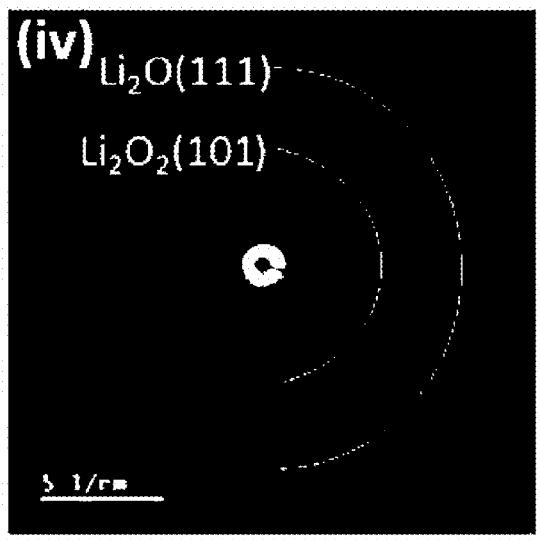

FIG. 12 shows HRTEM images and SAED patterns $Li_3N$ (i and ii) and a LiI electrode (iii and iv) after discharging in a DNNI system.

Referring to FIGS. 11 and 12, it was identified that $Li_2O_2$ and $Li_2O$ were formed in the discharging process in the LiI electrode, and it was identified that $Li_2O_2$, $Li_2O$, and $LiO_2$ were formed in the $Li_3N$ electrode in the discharging process. Through the above analysis, it may be seen that in the case of the DINN and the DNNI, $Li_2O$ and $Li_2O_2$ were more dominant discharge reaction products.

Accordingly, in the air electrode including the multi-layer structure with the extended three-phase boundary and the method for manufacturing the same of the inventive concept, the three-phase boundary, which is a point where the reaction product that determines the discharging capacity of the secondary battery is formed, and is the reaction region where the lithium ions/the electrons/the oxygen are all in contact, may be distributed throughout the air electrode.

In addition, the air electrode including the multi-layer structure with the extended three-phase boundary and the method for manufacturing the same of the inventive concept may achieve high theoretical discharging capacity of the lithium-air secondary battery and improve the charging-discharging life characteristics.

The above detailed description exemplifies the inventive concept.

In addition, the above-mentioned content is to describe a preferred embodiment of the inventive concept, and the inventive concept is able to be used in various other combinations, modifications, and environments. That is, changes or modifications are possible within the scope of the concept of the invention disclosed herein, the scope equivalent to the written disclosure, and/or within the scope of skill or knowledge in the art. The written embodiment is to describe the best state for implementing the technical idea of the inventive concept, and various changes thereof required in specific application fields and uses of the inventive concept are also possible. Therefore, the above detailed description of the invention is not intended to limit the inventive concept to the disclosed embodiment. The appended claims should also be construed to include other embodiments as well.

The air electrode including the multi-layer structure with the extended three-phase boundary and the method for manufacturing the same according to embodiments of the inventive concept expand the reaction region in which the oxygen reduction reaction and the oxygen evolution reaction occur, and at the same time, accelerate the reaction rate of the reactant.

In addition, there is the effect of achieving the high theoretical discharging capacity of the lithium-air secondary battery, and improving the charging-discharging life characteristics.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An air electrode for a lithium-air secondary battery composed of a lithium anode, a separator, and the air electrode, the air electrode comprising:
   an electrode current collector having a shape of a metal foam; and
   conductor layers disposed on top of and beneath the electrode current collector to form a multi-layer structure together with the electrode current collector,
   wherein the conductor layers include:
      a first conductor layer containing an electronically conductive material; and
      a second conductor layer containing a lithium ion conductive material,
   wherein the first conductor layer and the second conductor layer are respectively disposed at different locations among locations on top of and beneath the electrode current collector,
   wherein the multi-layer structure includes:
      a first multi-layer structure with the first conductor layer/the electrode current collector/the second conductor layer sequentially stacked; and
      a second multi-layer structure with the second conductor layer/the electrode current collector/the first conductor layer sequentially stacked,
   wherein the first conductor layer contains the electronically conductive material, a conductive carbon matrix, and a binder in a mass ratio of 4:(3.5-5.5):(0.5-2.5), and
   wherein the electronically conductive material includes one electronically conductive material selected from a group consisting of LiI, LiBr, and $InI_3$, and a group consisting of tetrathiafulvalene (TTF) and 2,2,6,6-tetramethyl-1-piperidinyloxy (TEMPO).

2. The air electrode of claim 1, wherein the second conductor layer contains the lithium ion conductive material, the conductive carbon matrix, and the binder in the mass ratio of 4:(3.5-5.5):(0.5-2.5),
   wherein the lithium ion conductive material includes one lithium ion conductive material selected from a group consisting of $Li_3N$, $Li_3PS_4$, $Li_{0.5}La_{0.5}TiO_3$, and $Li_3OCl$.

3. The air electrode of claim 2, wherein the electrode current collector contains one metal material selected from a group consisting of nickel, aluminum, iron, and copper.

4. The air electrode of claim 3, wherein the first multi-layer structure provides diffusion paths such that electrons are diffused in both directions from the first conductor layer to the lithium anode and to the second conductor layer,
   wherein the first multi-layer structure provides diffusion paths such that lithium ions are bi-directionally diffused from the lithium anode and the second conductor layer to the electrode current collector.

5. The air electrode of claim 4, wherein the second multi-layer structure provides a diffusion path such that the electrons are diffused from the first conductor layer to the lithium anode,
   wherein the second multi-layer structure provides diffusion paths such that the lithium ions are diffused from the lithium anode and the second conductor layer to the first conductor layer.

6. The air electrode of claim 5, wherein a toroidal reaction product is formed by a solution mechanism on a surface of the first conductor layer.

7. The air electrode of claim 6, wherein a reaction product in a form of a film is formed by a surface mechanism on a surface of the second conductor layer.

8. A lithium-air secondary battery comprising:
   a cathode including the air electrode of claim 1;
   a lithium anode; and
   a separator disposed between the cathode and the lithium anode.

* * * * *